United States Patent [19]

Louth

[11] Patent Number: 4,649,441
[45] Date of Patent: Mar. 10, 1987

[54] HEAD REEL SERVO SYSTEM IN A RECORDING AND/OR REPRODUCING APPARATUS

[75] Inventor: Kenneth Louth, Los Altos, Calif.

[73] Assignee: Ampex Corporation, Redwood City, Calif.

[21] Appl. No.: 655,983

[22] Filed: Sep. 27, 1984

Related U.S. Application Data

[63] Continuation of Ser. No. 364,652, Apr. 2, 1982, abandoned.

[51] Int. Cl.⁴ ............................................. G11B 15/18
[52] U.S. Cl. .................................... 360/71; 324/161; 324/166; 360/73; 361/242
[58] Field of Search ....................... 360/69, 70, 71, 73, 360/74.1, 74.2, 74.3; 73/507, 510; 324/160, 161, 166; 361/236, 240, 242

[56] References Cited

U.S. PATENT DOCUMENTS

| | | | |
|---|---|---|---|
| 3,792,460 | 2/1974 | Ratz | 340/271 |
| 3,915,271 | 10/1975 | Harper | 192/0.033 |
| 4,159,572 | 7/1979 | Nunes | 33/142 |
| 4,302,785 | 11/1981 | Mussatt | 360/72.1 |

Primary Examiner—George G. Stellar
Attorney, Agent, or Firm—James LaBarre; Joel D. Talcott

[57] ABSTRACT

An improved reel servo for a recording and reproducing machine is disclosed. The reel servo as well as other servos in the machine are controlled by a single microprocessor which results in greater inherent communication between such servos and significantly improved operating capabilities. The reel servo itself is adapted to have the supply and take-up reels operate in different kinds of close loop servo control during various operating modes. The servo circuitry provides instantaneous information to the microprocessor for determining the diameter of tape that is wrapped on each of the reels. The reel servo has the capability of performing high speed shuttle and cueing operations without engaging the capstan and the tensioning arm can be positioned to provide the appropriate tape tension during shuttling in both the forward and reverse directions. An acceleration loop controls the supply reel so that the tape tension is maintained within predetermined upper and lower limits.

25 Claims, 13 Drawing Figures

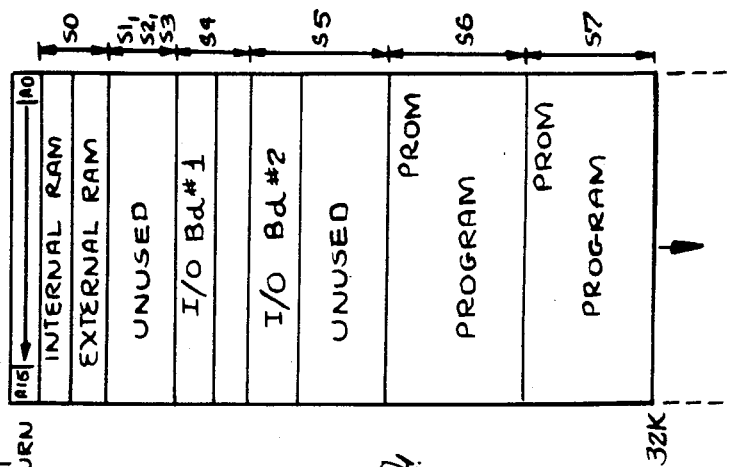
Fig. 4.
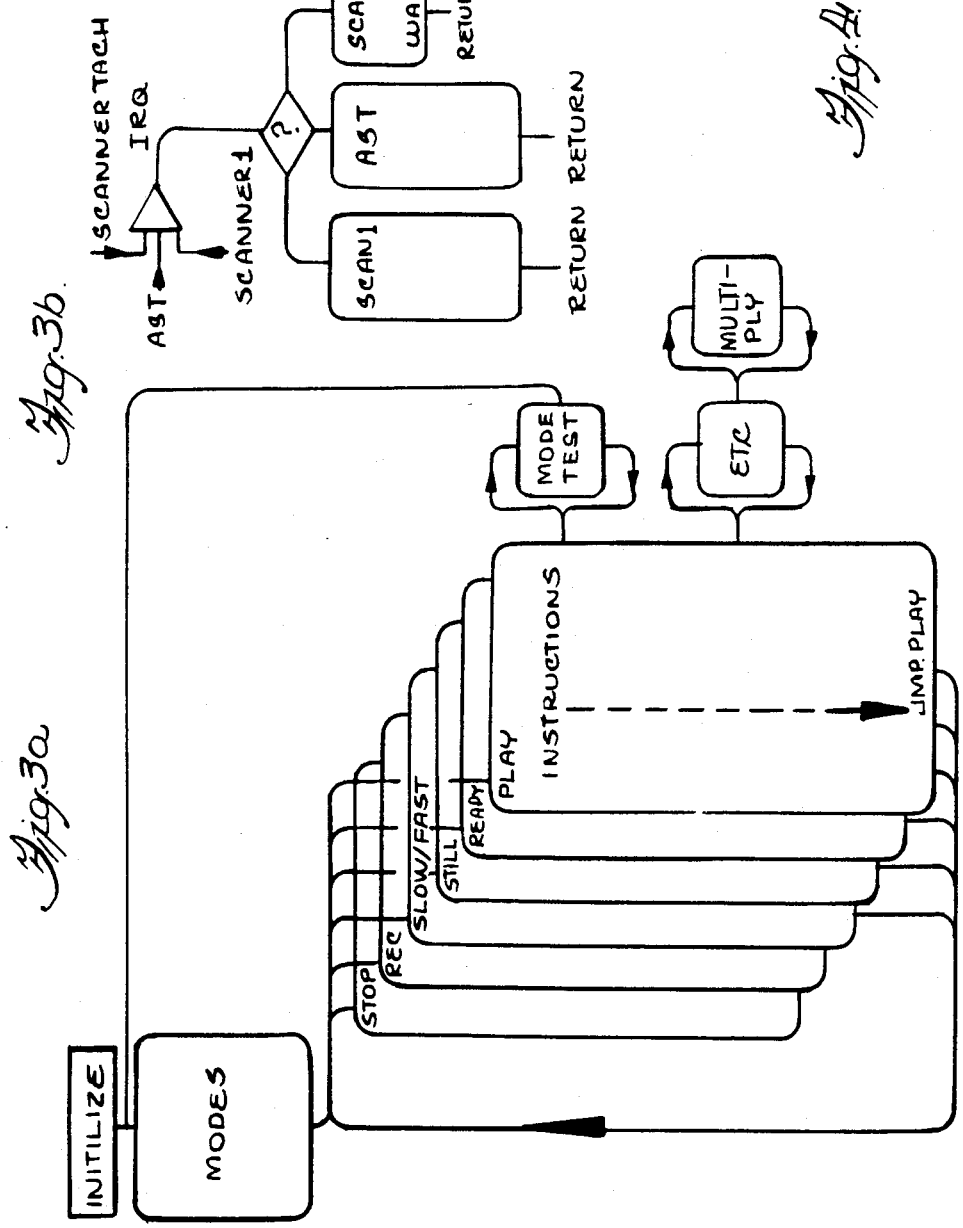
Fig. 3b.
Fig. 3a.

REEL SERVO
REC/PLAY/VAR

REEL SERVO
SHUTTLE/CUE/STILL (1) TAPE TACH (2) REEL TACH CTR 0

(3) REEL TACH CTR 1

(4) CTR 464

(5) CTR 466

(1) 2H CLOCK (LINE 520)

(2) TAPE TACH (LINE 516)
(3) TAPE TACH (LINE 518)

(4) CTR 502

(5) CTR 504

STOP

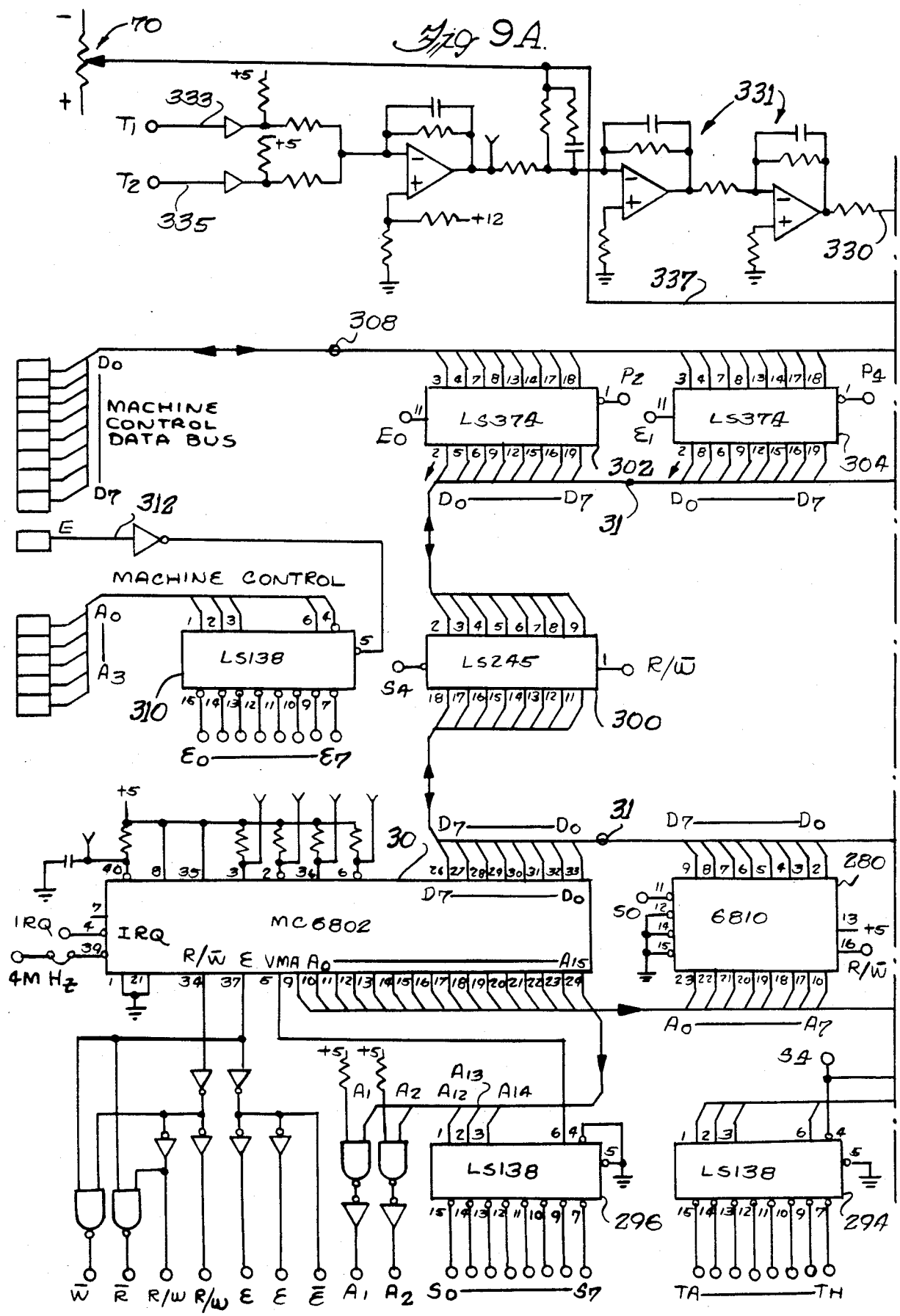

HEAD REEL SERVO SYSTEM IN A RECORDING AND/OR REPRODUCING APPARATUS

This application is a continuation of application Ser. No. 364,652 filed Apr. 2, 1982, now abandoned.

CROSS REFERENCE TO RELATED APPLICATIONS

MICROPROCESSOR CONTROLLED MULTIPLE SERVO SYSTEM FOR A RECORDING AND/OR REPRODUCING APPARATUS, Ser. No. 364,725, filed Apr. 2, 1982, by Kenneth Louth.

MICROPROCESSOR CONTROLLED REPRODUCING APPARATUS HAVING ASYNCHRONOUS REPRODUCING CAPABILITY Ser. No. 660,453 filed Oct. 2, 1984, a continuation of, Ser. No. 364,793, filed Apr. 2, 1982, by Kenneth Louth now abandoned.

PHASE DETECTOR CONTROL FOR A SERVO SYSTEM, Ser. No. 608,268 filed May 7, 1984, which is a continuation of Ser. No. 364,964, filed Apr. 2, 1982, by Kenneth Louth, now abandoned.

AUTOMATIC SCAN TRACKING SERVO SYSTEM, Ser. No. 364,961, filed Apr. 2, 1982, by Kenneth Louth.

PROGRAMMABLE NONLINEAR SPEED CONTROL FOR A RECORDING AND/OR REPRODUCING APPARATUS, Ser. No. 364,962, filed Apr. 2, 1982, by Kenneth Louth.

AN IMPROVED SCANNING SERVO SYSTEM IN A RECORDING AND/OR REPRODUCING APPARATUS, Ser. No. 364,963, filed Apr. 2, 1982, by Kenneth Louth.

The present invention generally relates to servo systems for recording and reproducing apparatus and, more particularly, to a microprocessor controlled head system servo for a magnetic tape recording and reproducing apparatus.

It is readily appreciated that video recording and reproducing apparatus, particularly, apparatus that records and reproduces video information of broadcast quality, is highly technical and complex equipment that requires sophisticated electronic as well as mechanical components and systems. For broadcast quality recording and reproducing apparatus, particularly video tape recording and reproducing apparatus, the level of technical sophistication is extraordinary in terms of the amount of control that is required to reliably operate the apparatus at broadcast quality standards. Such videotape recording apparatus have a number of servo systems which control their operation, including a servo system which controls the reel drive motors which drive the supply and take-up reels.

While the improved reel servo of the present invention is only one of the major servos of a recording and/or reproducing apparatus that are controlled by a single microprocessor, the reel servo of the present invention contains many desirable functional features that are not found in prior art reel servos, including microprocessor controlled reel servo systems. There is little doubt that the use of a single microprocessor for controlling all of the major servos in the apparatus results in significant improvements in terms of the inherent communication between the various servos. The interaction of one servo with another in a more intimate manner also provides improved functional capabilities that are very difficult to implement using hardwired logic and other circuitry.

Accordingly, it is an object of the present invention to provide an improved reel servo for a recording and/or reproducing apparatus which has the supply reel operating in a position servo loop with respect to the tensioning arm of the recording apparatus during all operating modes, wherein the take-up reel motor is operated to provide a predetermined torque during certain capstan engaged modes and in a velocity loop during other operating modes.

It is another general object of the present invention to provide an improved reel servo of the foregoing type which, by virtue of its desirable functional operating capabilities, is adapted to perform high speed shuttle and cueing operations without the need for capstan control.

Yet another detailed object is to provide an improved reel servo of the foregoing type wherein the supply reel is operated in a position loop in the capstan nonengaged modes of shuttle, cue and still frame reproducing and the take-up reel is operated in a velocity loop during such modes.

Another object of the present invention is to provide an improved reel servo of the foregoing type which, during the shuttle mode appropriately positions the tension arm to increase tension when shuttling in the reverse direction so that the dynamic characteristics of shuttling in the forward and reverse directions are generally similar.

Still another object of the present invention is to provide an improved reel servo of the foregoing type which utilizes longitudinal tape speed information together with reel tachometer information to instantaneously determine the diameter of tape wrapped on each of the reels. An associated object is to provide the diameter information in a novel way whereby it is instantaneously available to the microprocessor for control of the reel servo as well as other servos.

It is yet another object of the present invention to provide an improved reel servo which provides an acceleration servo loop during shuttle, to control the supply reel so that the tape tension does not go outside of predetermined upper and lower limits.

Other objects and advantages will become apparent upon reading the following detailed description, while referring to the attached drawings.

DESCRIPTION OF THE DRAWINGS

FIGS. 3a and 3b are very broad flow charts illustrating the software functional operation of the microprocessor;

FIG. 4 is a map illustrating the manner in which the software instructions are located within the associated microprocessor memories;

FIGS. 9a and 9b together comprise a detailed electrical schematic diagram illustrating the microprocessor together with machine control interfacing circuitry and multiplexing analog-to-digital converting circuitry;

DESCRIPTION OF THE APPARATUS

Broadly stated, the reel servo system of the present invention is controlled by a microprocessor which also controls the other major servo systems of a tape recording and reproducing apparatus, the other servos of which include: (1) a scanning head servo which rotates the transducing head at the proper speed during operations; (2) a capstan servo which controls the movement of the tape during recording and during most, but not all reproducing operations; and, (3) the automatic scan tracking servo which controls the transverse movement of the reproduce head relative to the longitudinal direction of the track to have it accurately follow a track during reproducing and particularly during reproducing for special motion effects wherein the tape is being transported at a speed other than normal playback speed. The microprocessor receives digital information as well as digitally converted analog information from various locations throughout the circuitry and apparatus, processes such information and thereafter provides digital output signals to other circuitry, some signals of which are converted into the analog domain for controlling the various operations that are performed by the apparatus in its various modes. The nature of the operation of the other servos and the circuitry that carries out the operation thereof will not be specifically described herein, but such servos are comprehensively described in the cross referenced related application entitled "Microprocessor Controlled Multiple Servo System for a Recording and/or Reproducing Apparatus", Ser. No. 364,725, filed on even date herewith and assigned to the same assignee as the present invention. The specification and drawings of such application are specifically incorporated by reference herein.

Figure 1:
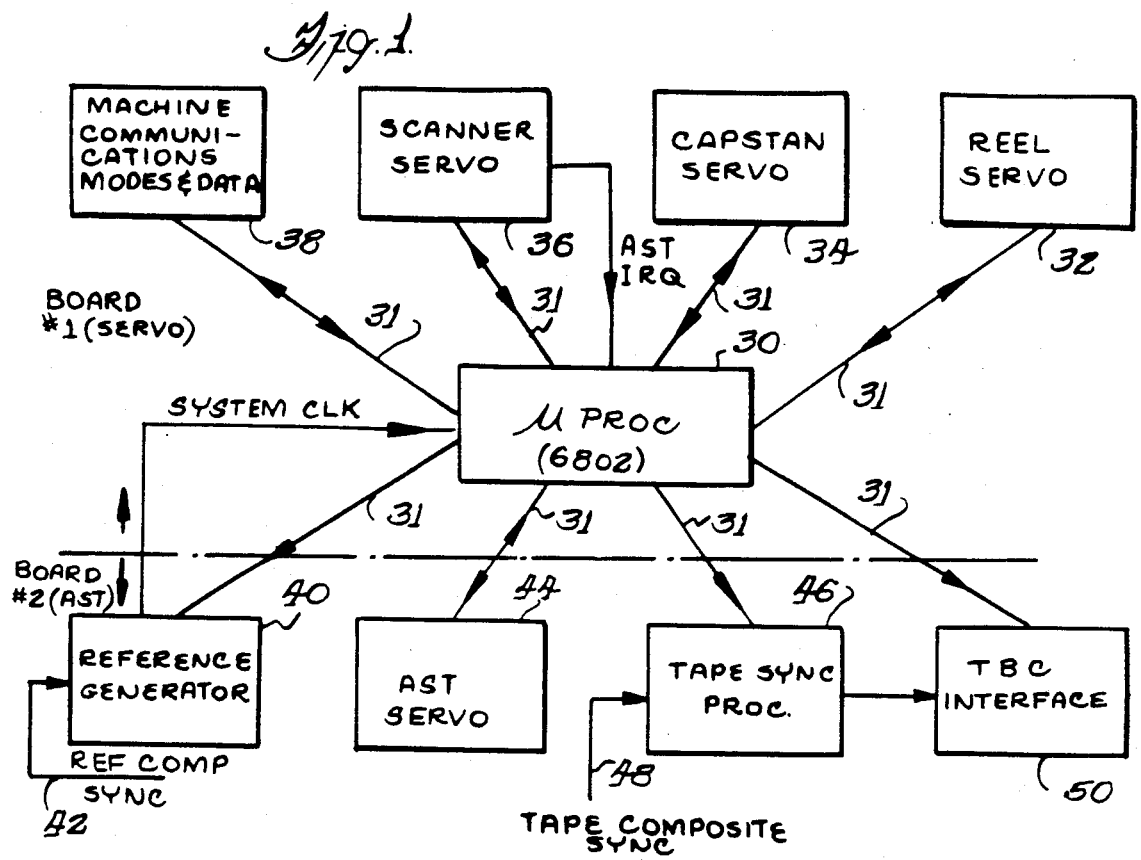
FIG. 1 is a functional block diagram illustrating the functional interaction of the microprocessor with the various servo systems of the apparatus, and of the microprocessor and other important circuitry.

Turning initially to the block diagram of FIG. 1, there is shown a microprocessor 30 which is interconnected by a data bus 31 with a reel servo 32, a capstan servo 34, a head scanner servo 36 and a machine communication interface and data 38 which essentially controls the various operating modes of the recording and reproducing apparatus as manipulated by an operator either directly or from a remote location. The microprocessor also interacts with a reference generator 40 which receives as an input thereto a reference station composite sync signal via line 42 the reference generator generates system clocks that control the microprocessor, which in turn synchronizes all of the clock timing of the servos and other circuitry. The microprocessor also interacts with the automatic scan tracking servo 44 and a tape sync processor 46 which has a tape composite sync signal input via line 48. The tape sync processor additionally provides a signal to the time base corrector interface 50 which provides appropriate timing and control signals for use by the time base corrector to provide a broadcast quality video image having the requisite stability and vertical display position with respect to system reference as well as the correct chroma information, which processing varies depending upon what reproducing mode the apparatus is being operated.

Figure 2:
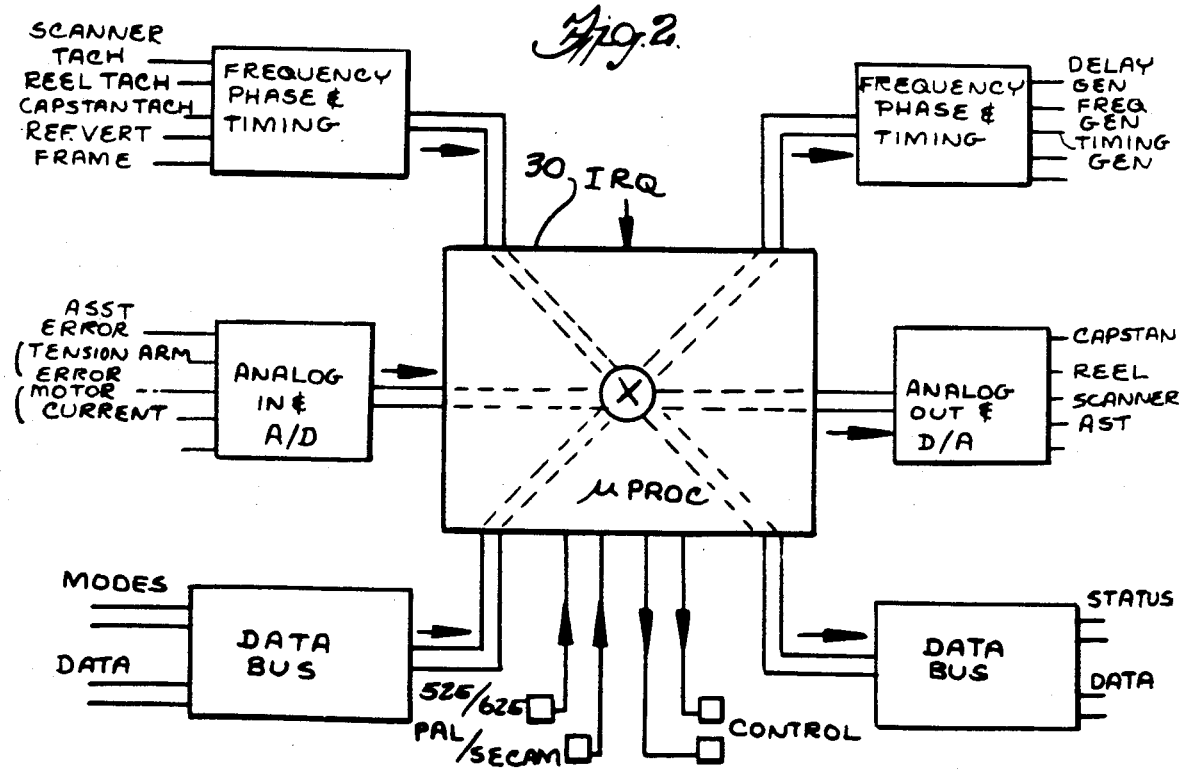
FIG. 2 is another functional block diagram of the microprocessor and illustrates the manner in which it receives input information relating to the operation of the apparatus and provides output signals that are used to control the operation of the apparatus.

While the functional block diagrams shown in FIG. 1 illustrate the interaction of the microprocessor with the various servo systems of the apparatus, with machine control and with the time base corrector and the like, the system can also be functionally described in terms of input and output signals that are provided to and from the microprocessor and this functional block diagram is shown in FIG. 2. The microprocessor 30 receives frequency, phase and timing data shown by the upper left functional block including such input signals as head scanner tach pulses, reel tach pulses, capstan tach pulses, reference vertical and frame timing signals, which are converted into digital information for processing by the microprocessor. The microprocessor also receives analog information shown by the block left of the microprocesor which is converted into digital information for processing by the microprocessor and such analog input signals include the automatic scan tracking error signals, the tension arm error signals and various signals related to motor currents of the reel drive motors, the capstan drive motor and the head scanner drive motor. The data bus also receives operating mode information as well as other machine control data and it processes this information and provides status information and other data. The microprocessor generates digital information which is converted to analog information and these analog output signals include control signals for the capstan servo, the reel servo, the head scanner servo and the automatic scan tracking servo. Similarly, the microprocessor provides frequency, phase and timing output information which include delay signals, phase and timing output information that are used by the various servos and other circuits of the apparatus.

The microprocessor controlled system of the present invention has a unique advantage in that it is adaptable for recording and reproducing video signals from any standard worldwide format, i.e., it can record and reproduce a NTSC signal having 525 lines or a PAL or SECAM signal having 625 horizontal lines. The input control line can be set to operate either as a 525 or 625 line system and the various constants and other software values which control the servos and other circuitry of the apparatus will be selected for proper operation. Similarly, another control line can be set for either a PAL or SECAM format system once a 625 line system is specified. The software in memory includes instructions and numerical constants that will permit the apparatus to properly operate regardless of the television signal format that is selected.

In accordance with an aspect of the present invention, the microprocessor controlled servo system described herein is adapted to control the reel servo system and the head scanner servo system during the high speed shuttle mode in a way so as to protect the recording and reproducing heads, while the tape is being wound off one of the reels onto the other. In the past, as the tape was nearing the end so as to be wound on a single reel during high speed shuttle, the potential for chipping the ceramic recording and reproducing heads was quite high. In accordance with an aspect of the apparatus described herein, during high speed shuttle, reel tape pack diameter information that is determined by the microprocessor is used to control the reel servo and the scanning head servo to perform a sequence of events which substantially reduce if not eliminate the possibility of heads being chipped. When the microprocessor determines that the tape has almost reached the end of being wound off of one reel, it controls the reel servo to stop the tape and it also reverses the head scanner motor current to brake the rotation of the heads scanner. After the tape has been stopped, the reel servo moves the tape at a relatively slow rate, e.g., twice normal recording speed, and the rotating head assembly is allowed to coast while the tape is wound entirely off of one reel on to the other.

The apparatus is programmed to operate in various operating modes as is shown in the broad flow chart of FIG. 3a. The flow chart representing microprocessor software shows that once the machine is initialized, a mode is selected and these modes include stop, record, slow and fast motion reproduce, stop motion or still frame reproduce, ready and normal play. Once. the apparatus is placed in an operating mode, then it undergoes a mode test to determine if it is a valid mode and if such is the case, it will return to that mode and begin running the program that controls the appartus in that mode. If the mode test is invalid, then it will return to the stop mode and the apparatus will stop. After the apparatus is placed in a valid mode, it will continue in that mode until some event occurs, such as a mode change or a completion of some operation. Included as part of each operating mode are various subroutines which are called as shown in FIG. 3a. Certain ones of these subroutines are used in various ones of the operating modes. For example, the play mode will contain a block of code instructions that will call up various subroutines in the specified order. As long as the apparatus is operating in the play mode it will repetitively go through this block of code instructions. When the head scanner pulse tachometer occurs, it will cause an interrupt to the microprocessor as shown in FIG. 3b.

The microprocessor operates on an interrupt basis, with an interrupt resulting from one of three inputs. The software determines which input caused the interrupt and the microprocessor then enters the appropriate block of code which runs through various subroutines until it reaches the end and then returns to the instruction that had previously been completed prior to the interrupt. The scanner tachometer pulse originally triggered a counter which has a count that exceeds the maximum time required to store all current relevant information in stack registers in the microprocessor. When this is done, it is ready to immediately perform the instructions in the scanner 1 block of code. This is carried out by the scanner interrupt block of code which causes the microprocessor to store the information and then literally wait for the scanner 1 interrupt. After the scanner 1 block of code is run, the microprocessor removes the information from the stack registers and resumes running through the instructions specified by the operating mode.

Complete software for operating the microprocessor for controlling all of the servos and other operations shown in the block diagrams of FIGS. 1, 2, 3a and 3b is contained in the computer code listings attached hereto as Appendix A. The program is written in a clear and concise manner to minimize the amount of memory that is required to perform the various operations. In this regard, FIG. 4 illustrates a memory map having 32,000 memory locations. As is shown in FIG. 1, the entire circuitry for the various servos and other operations are contained in two printed circuit boards with the upper first board containing most servos and the microprocessor itself and the second board containing the automatic scan tracking servo, reference generator, tape sync processor and time base corrector interface circuitry. In the memory map shown in FIG. 4, the program is written to utilize various portions of the 32K memory and the memory is segregated into eight separate 4K sections 50 through 57, which are decoded by address bits 12 through 14 which are used to place memory instructions in certain areas of the memory. For example, the address areas $S_4$ is used to identify the input/output circuitry of the first board and area $S_5$ identifies a 4K section of memory wherein instructions relating to the operation of input/output portion of the second board are contained. Sections $S_1$, $S_2$ and $S_3$ are shown to be decoded but are not used during operation of the apparatus. Thus, from the illustration of FIG. 4 it should be appreciated that the entire operation of all of the servos and other operations shown in the block diagram of FIGS. 1 and 2 are carried out utilizing less than 4K of program. The operation of the head scanner servo system will now be broadly described on a functional level, followed by a more detailed description of the servo as well as other portions of the microprocessor controlled system.

Broad Reel Servo Description

Figure 5:
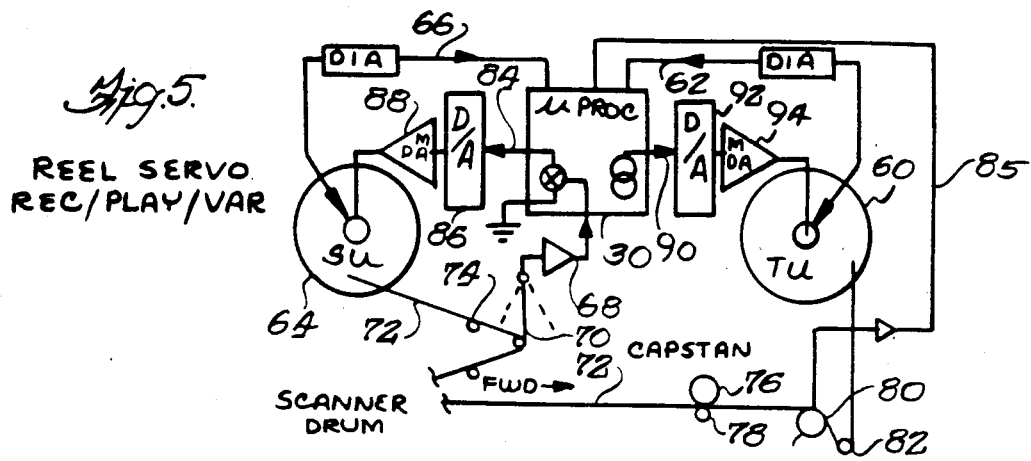
FIG. 5 is a functional block diagram of the reel servo system during operation in the record, play and variable speed reproduce modes wherein the capstan is engaged.
Figure 6:
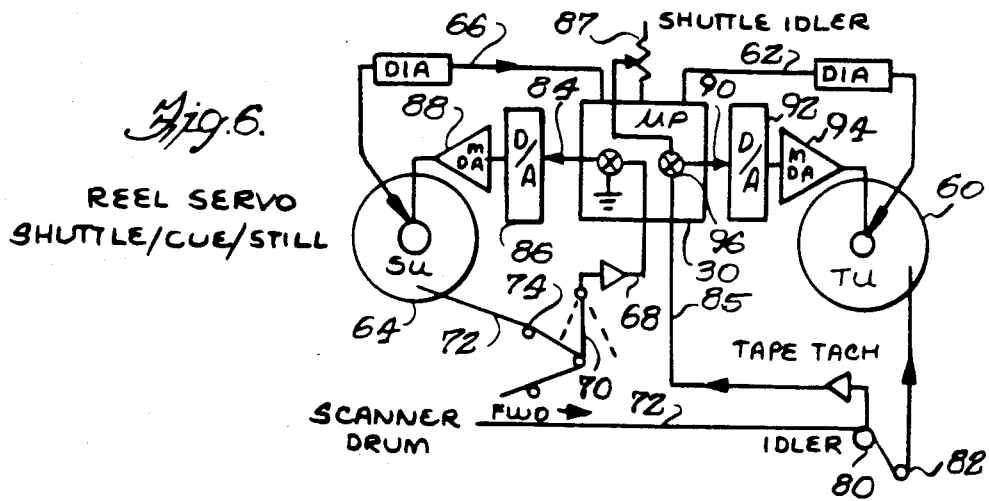
FIG. 6 is a functional block diagram of the reel servo system as operated in the shuttle mode, during cueing and during still frame reproducing mode wherein the capstan is not engaged.

In accordance with an important aspect of the present invention, the reel servo system will now be described in conjunction with two functional block diagrams shown in FIGS. 5 and 6. The upper block diagram shown in FIG. 5 illustrates the reel servo system in its capstan engaged mode whereas the block diagram of FIG. 6 illustrates the reel servo in its capstan nonengaged mode. The capstan is engaged in the modes of record, normal play and variable speed reproducing, except still frame reproducing, and is not engaged in shuttle, cue and still frame reproducing.

While the block diagram of FIGS. 5 and 6 are relatively self-explanatory, the components thereof include the microprocessor 30 which receives input information such as tachometer pulses from the take-up reel 60 via line 62, tachometer pulses from the supply reel 64 via line 66 and input information via line 68 relating to the position of a tensioning arm 70 around which tape 72 is wrapped. Thus, the tape from the supply reel passes over a guide 74 and the tensioning arm 70 about the helical wrap scanning drum (not shown), past the capstan 76 which engages the tape in cooperation with a pinch roller 78 on the opposite side of the tape. The tape is then wound around an idler 80, another guide 82 and onto the take-up reel 60. The microprocessor 30 receives the tachometer input information which enables it to compute the diameter of tape pack wrapped on the supply and take-up reels, and it also receives signals that indicate the position of the tension arm 70. The microprocessor provides output signals via line 84 to a digital-to-analog converter 86 which provides an analog signal which controls a motor drive amplifier 88 that in turn controls the supply reel drive motor. In a similar manner, the microprocessor controls the take-up reel via output line 90, digital-to-analog converter 92, and motor drive amplifier 94 for driving the take-up reel motor. As is shown in FIGS. 5 and 6, the idler 80 has a tachometer which provides a tape tach signal on line 85 indicating the tape speed and is applied to the microprocessor 30. A potentiometer 87 (FIG. G) that is controllable by an operator also provides an input signal to the microprocessor relating to the speed of the tape during shuttling which is controlled by an operator.

When the reel servo is in a capstan engaged mode as shown in FIG. 5, and the take-up reel 60 is receiving tape, the torque on the tape is controlled as a function of the size of the tape pack wrapped on the reel (the reel size) and it is controlled so that the capstan drive motor will perform a known and precise amount of work. In other words, when it is operating in the capstan engaged mode, the tension on the tape will be controlled so that the capstan drive motor is doing a precise amount of work. This will prevent the capstan drive motor from operating in a cross-over area of the motor drive amplifier. In this mode, the supply reel is controlled by a position servo loop having as its components the tension arm, the microprocessor, the digital-to-analog converter and the motor drive amplifier. During this mode, the microprocessor generates the error information, the reel tape pack diameter information, the reel speed information, the tape speed information and utilizes this information to provide the digital output signals to the digital-to-analog converter to properly control the motor drive amplifier. The microprocessor measures the tape pack diameter by calculating the same utilizing tachometer pulses from the reel tachometers together with tape speed information from the idler tachometer.

When the reel servo is operating in the capstan nonengaged modes during forward or reverse shuttle as well as cue and in the still frame reproducing mode, the block diagram of FIG. 6 illustrates the manner in which the reel servo operates. When the reel servo is operating in the forward or reverse shuttle or cue modes, the take reel up 60 is controlled in a velocity servo loop mode. The velocity servo loop uses the tape tachometer pulses from the idler tachometer which are indicative of the tape speed and compares them to a reference which is derived from an 8-bit number that is determined by the setting of the shuttle potentiometer control 87 in FIG. 6. As shown therein, the tape tachometer signal is applied to a comparator 96, the other input of which is supplied by the reference and provides a digital signal to the digital-to-analog converter 92 for controlling the motor drive amplifier 94 to operate the take up reel drive motor. In this manner, the take up reel will supply tape 72 at the speed determined by the operator, such as 150 or 300 i.p.s., for example.

The use of the velocity servo loop enables accurate control of the transport at low speeds, without the use of the capstan 76 which, as previously mentioned, is not engaged during shuttle, cueing and still frame reproducing. When the tape is being shuttled in either direction, take up reel operation is controlled by a velocity servo loop and the supply reel operation is controlled by a position servo loop in the same manner as described with respect to FIG. 5. When the tape is being shuttled in the forward direction, the tension arm reference is moved to the right which actually decreases the tension in the tape, such that the take up reel will pack or wind tape thereon with a nominal predetermined tension. When the tape is being shuttled in the reverse direction, the tension arm is moved to the left to increase the tape tension. This has the effect of overcoming friction of the transport and results in tape being wound onto the supply reel with a nominal predetermined tension. In this manner, the frictional load is maintained in the velocity loop and the supply reel is controlled as a function of the tension in the tension arm. It should be appreciated that while the dynamic characteristics in the forward direction are quite different from the dynamic characteristics in the reverse direction, the switching of the position loop tension arm reference from side to side causes the dynamic characteristics of forward and reverse to be comparable to one another.

A potential problem is produced if the tape is moved in the reverse direction. This can be appreciated by the example of the take-up reel feeding tape into the tension arm and wherein a significant amount of friction is present so that the tape sticks in the transport and is not supplied to the tension arm. Stated in other words, if the take-up reel pushes tape forward the idler fast enough to put slack in the tape (sometimes referred to as "throwing a loop"), then it will lose contact with the idler and accurate cueing will not be possible, since the idler tachometer counter provides such information relating to tape movement.

To overcome the potential problem of throwing a loop in the tape which would detrimentally affect the cueing operation due to loss of contact by the idler 80 and therefore the tape tachometer counter, the tension arm 70 is repositioned to the left to increase the tension in the tape between the tension arm and the take-up reel 60 to thereby overcome the friction in the transport including friction caused by the scanner, the guides, the idler arm and the like. To increase the tension, the microprocessor merely moves the tension arm to the left to increase the tension on the tape and after the tension arm is moved to its new position, then the take-up reel will begin to supply or push tape toward the idler and the increased tension caused by the tension arm will prevent any slack occurring in the tape path.

The reel servo also has an acceleration loop control provided by the microprocessor to insure that during shuttle, the tape is not being moved too rapidly for either the take-up or supply reel. Thus, after the tension arm is appropriately located to provide the proper tape tension for packing the tape onto one of the reels as previously described, limits of tension arm movement are set (which are preferably different for each direction of tape movement) and as the tape is accelerated to its shuttle speed, any movement of the arm beyond one of the limits causes the take-up reel speed to be changed to return the arm to a position within the limits which returns the arm to the required tension.

Another mode that is programmed into the reel servo is a threading mode which is carried out before any active operational mode is performed. The microprocessor essentially determines if the transport has been operated after it has been threaded. If a tape is placed on the apparatus and is not manipulated to remove the slack in it, then if it is placed into one of the active operating modes, it could be possible to snap the tape taut and stretch it, or violently move the tension arm or the like, which could damage the tape and/or the transport components. Thus, the threading mode is effective to slowly wind the supply and take-up reels relative to one another so as to bring the tape to a proper tension level and effectively slowly and carefully remove any slack in the tape and this is done by the microprocessor through programmed control. Essentially, the program includes an instruction which asks if the tape had previously been threaded before an active operation is commenced and if it had not, then it slowly drives the reel motors to remove the slack in the tape by measuring the position of the tension arm and as the tape is brought to its proper tension level, the tension arm will be moved into a positional range that is appropriate for the particular operation that will be accomplished. When it reaches its nominal range, then the program control permits the active operation to commence.

The Microprocessor Circuitry

Figure 9B:
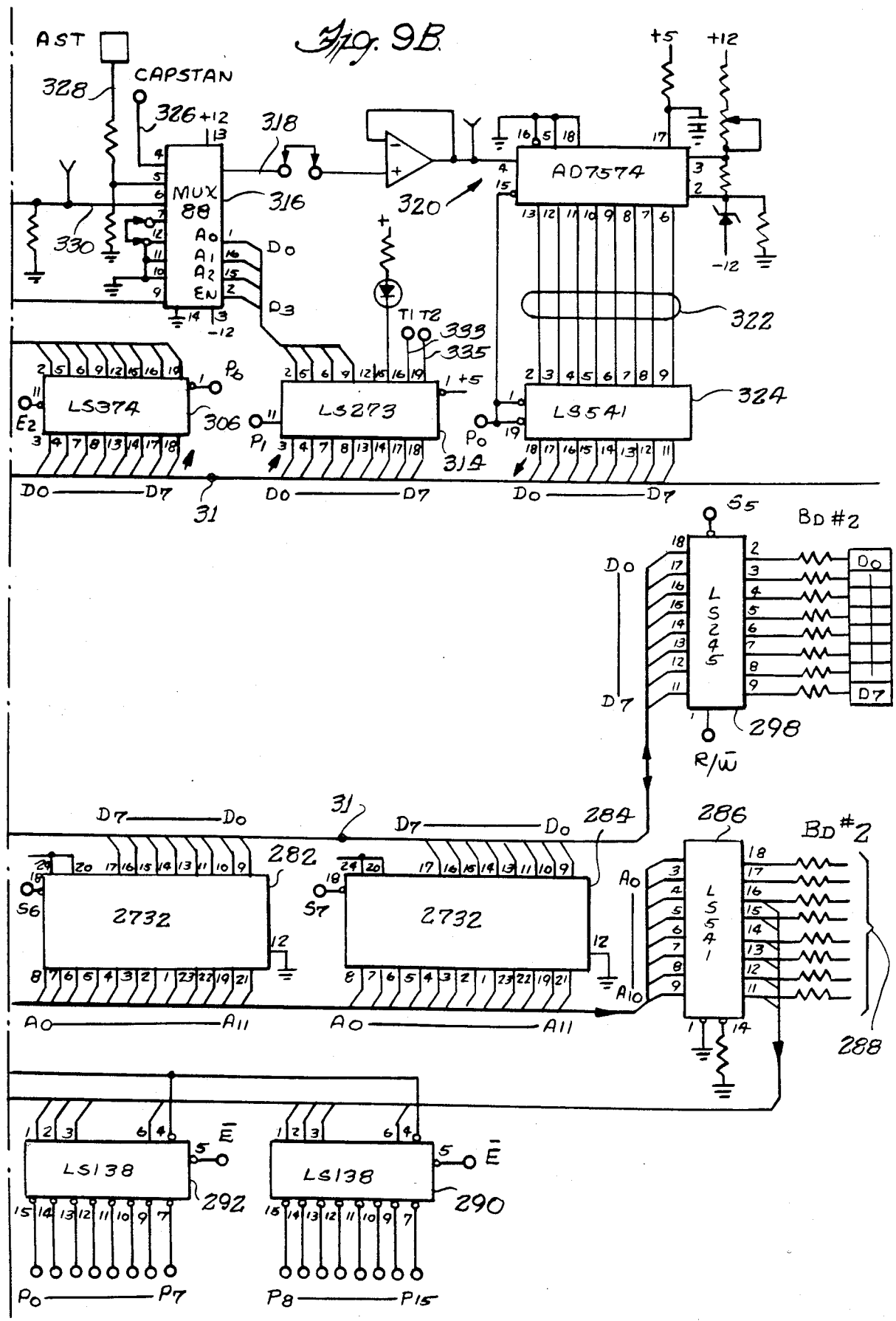

Before describing the detailed electrical circuit schematic diagrams of the head scanner servo or capstan servo previously described with respect to the functional block diagrams diagram of FIG. 5, the schematic diagrams which contain the microprocessor 30 itself will be briefly described in connection with FIGS. 9a and 9b which together comprise a single schematic. As previously mentioned, and as has been shown by the block diagram of FIG. 1, the bulk of the circuitry of the apparatus described herein is contained on only two printed circuit boards and one of said printed circuit boards contains the microprocessor itself. The layout of the circuitry is such that address control of bidirectional buffers enable the data bus from the microprocessor to be connected to either the first or the second printed circuit board. As shown in FIG. 9a, the microprocessor 30, which is a Motorola integrated circuit Model MC 6802 has 16 address lines which address circuit components as well as specific addresses of memory circuits. As shown on the lower portion of the microprocessor 30 in FIG. 9a, address lines $A_0$ through $A_{15}$ extend rightwardly to a random access memory 280 which is controlled by address lines $A_0$ through $A_7$, as well as respective programmable read only memories 282 and 284 (FIG. 9b) which are controlled by address lines $A_0$ through $A_{11}$. The address lines also extend to a buffer 286 which has output lines indicated generally at 288 which extend to the second printed circuit board address lines. The lines 288 also extend downwardly to respective decoder integrated circuits 290 and 292 which are used to select ports $P_0$ through $P_{15}$. The address lines also extend to yet another decoder 294 wich provides selection of various programmable timer integrated circuits $T_A$ through $T_H$.

Decoders 290, 292 and 294 are enabled when a master decode enable line $S_4$ is active and this is provided by a master decode circuit 296 located to the left of the decoder 294. As is clearly illustrated, address lines $A_{12}$, $A_{13}$ and $A_{14}$ from the microprocessor 30 control the address selection master decode enable output lines $S_0$ through $S_7$ that activate various portions of the circuitry. For example, when active the decoded output line $S_0$ enables the random access memory 280, decode output $S_6$ enables the memory 282 and decode output $S_7$ similarly enables memory 284. The data bus 31 from the microprocessor comprises eight output lines $D_0$ through $D_7$ extending to the memories 280, 282, 284 as well as to bidirectional buffers 298 and 300. Buffer 290 has output lines that extend the data bus to the second printed circuit board, and it is activated by the decode output $S_5$. Activation of the decode output $S_4$ enables the decoders 290, 292 and 294 as well as the other bidirectional buffer 300 which effectively extends the data bus to the remaining circuitry shown in the upper portion of FIGS. 9a and 9b and to remaining circuitry on board No. 1.

As shown in FIG. 9a, the data bus 31 has input latches 302 and 304 connected thereto and an output latch 306 being shown in FIG. 9b. The data lines 308 are also connected to these latches and the lines 308 represent a data bus to the machine control system which has a separate microprocessor controlled system for carrying out other machine control functions of the apparatus independently of the system controlled by microprocessor 30. The interaction of operator control and mode switches, diagnostics and the like with the servo system of the present invention is carried out through this data bus via the latches 302, 304 and 306. These latches are respectively enabled by enable lines $E_0$, $E_1$ and $E_2$ which are decoded outputs of a decoder circuit 310 that has operator activated address lines $A_0$ through $A_3$ from the machine control system. The decode circuit 310 is enabled by a line 312 from the machine control system. By selectively enabling decode output lines $E_0$, $E_1$ and $E_2$, data can be input into the latches 302 and 304 for communication onto the data bus of the microprocessor 30 and enabling the latch 306 permits data from the microprocessor 30 to be latched therein for communication to the machine control system via lines 308.

The remaining portion of the circuitry shown in the upper portion of FIGS. 9a and 9b concern the analog information input that is provided to the microprocessor 30. When port $P_1$ from decoder 292 is active, a latch 314 that is connected to the data bus can receive a data word which decodes an address for controlling a multiplexing switch 316. The switch 316 selects one of the left inputs thereof for application onto line 318 that extends to an analog-to-digital converter, indicated generally at 320, having output lines 322 which extend to a latch 324 which applies data onto the data bus for use by the microprocessor when a port line $P_0$ is enabled from the address decoder 292.

The multiplexing switch 316 can select a capstan servo control track error signal applied via line 326, an automatic scan tracking movable element position error signal applied via line 328 or a signal that is indicative of the position of the tension arm 70 applied via line 330. The circuitry at the upper portion of FIG. 9a provides an analog signal on line 330 that represents the position of the previously described tension arm through appropriate loop compensation circuitry indicated generally at 331. The arm positional reference for forward and reverse arm locations during shuttle and still frame reproducing is set by coding lines 333 and 335 by means of the output latch 314 from the microprocessor. In addition, line 337 can be selected to measure the actual mechanical arm position for tape threading and unthreading.

Figure 8:
Figure 8:
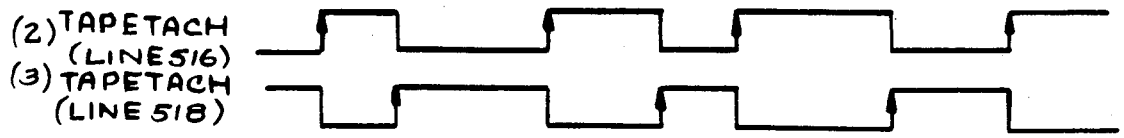
Figure 8:
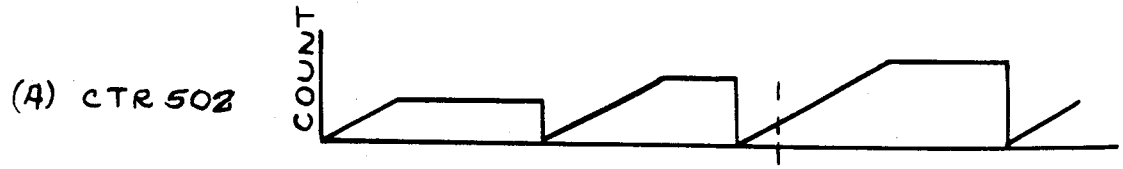
Figure 8:
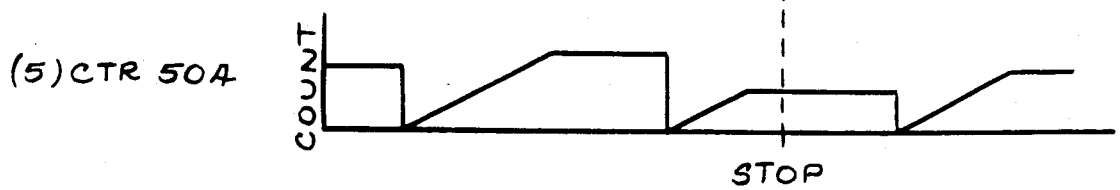

Two sets of port and timer circuit decoders are employed in the preferred apparatus of the invention. One set has been previously described with reference to FIGS. 6a and 6b, namely port decoders 290 and 292 (FIG. 6b) and timer circuit decoder 294 (FIG. 6a). FIG. 8 illustrates the second set of decoders comprising port decoder 1002 and timer circuit decoder 1004. The first set of decoders illustrated in FIGS. 6a and 6b respond to selected ones of the address signals A0-A15 issued by the microprocessor 30, selected ones of the master enabling signals S0-S7 issued by decoder 296 and system clock signal E to enable selectively ports and timer circuits of the machine communication circuitry 38, scanner servo 36, capstan servo 34 and reel servo 38 (FIG. 1). The second set of decoders illustrated in FIG.

8 similarly function to issue selectively port enabling signals (decoder 1002) and timer circuit enabling signals (decoder 1004) to the reference generator 40, the AST servo 44, tape sync processor 46 and TBC interface 50 (FIG. 1). More specifically, the second set of decoders receives buffered address signals over lines 1006 from the buffers 286 (FIG. 6b). These address signals together with master decode select signal 85 received over line 1008 from the master decoder 296 (FIG. 6a) and the system clock signal E received from the microprocessor 30 over line 1010 enable the decoders 1002 and 1004 to issue the port and timer circuit enabling signals according to the functions being performed by the apparatus as determined by the operator manipulated controls and the controlling microprocessor software. In addition, the second set of decoders receives a read/write command W from the microprocessor 30 (FIG. 6a) over line 1012 and, through logic 1014 comprising NAND gates and inverters, generates retimed read command R, write command W and oppositely master clock signals E and $\overline{E}$. These signals are employed together with the port and timer circuit enable signals to control the operation of aforementioned reference generator 40, AST servo 44, tape sync processor 46 and TBC interface 50.

The Reel Servo Circuitry

Figure 7:
FIGS. 7 and 8 are timing diagrams that are useful in illustrating the operation of the reel servo system.
Figure 7:
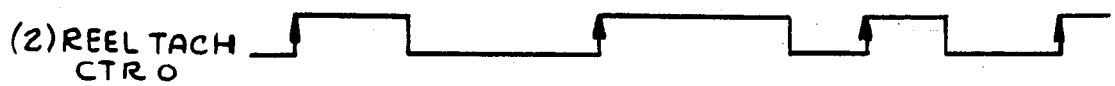
Figure 7:
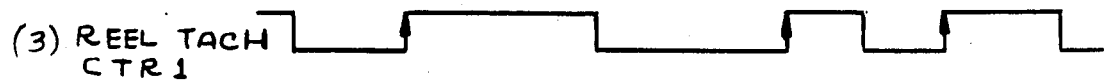
Figure 7:
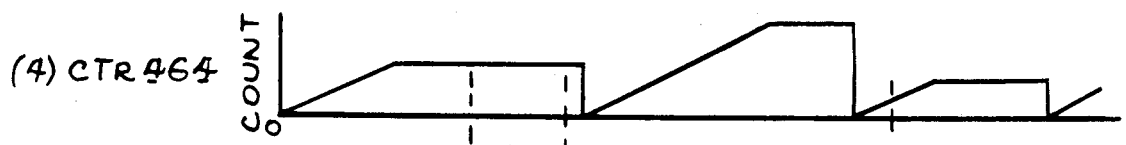
Figure 7:
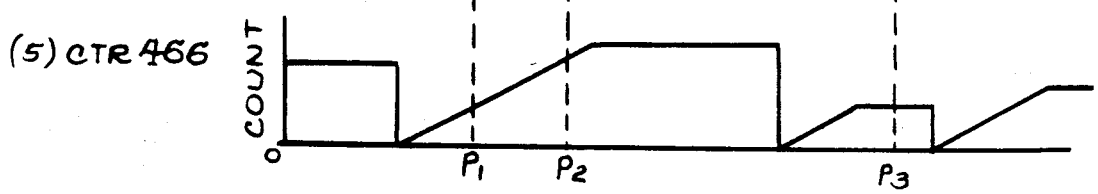
Figure 10:
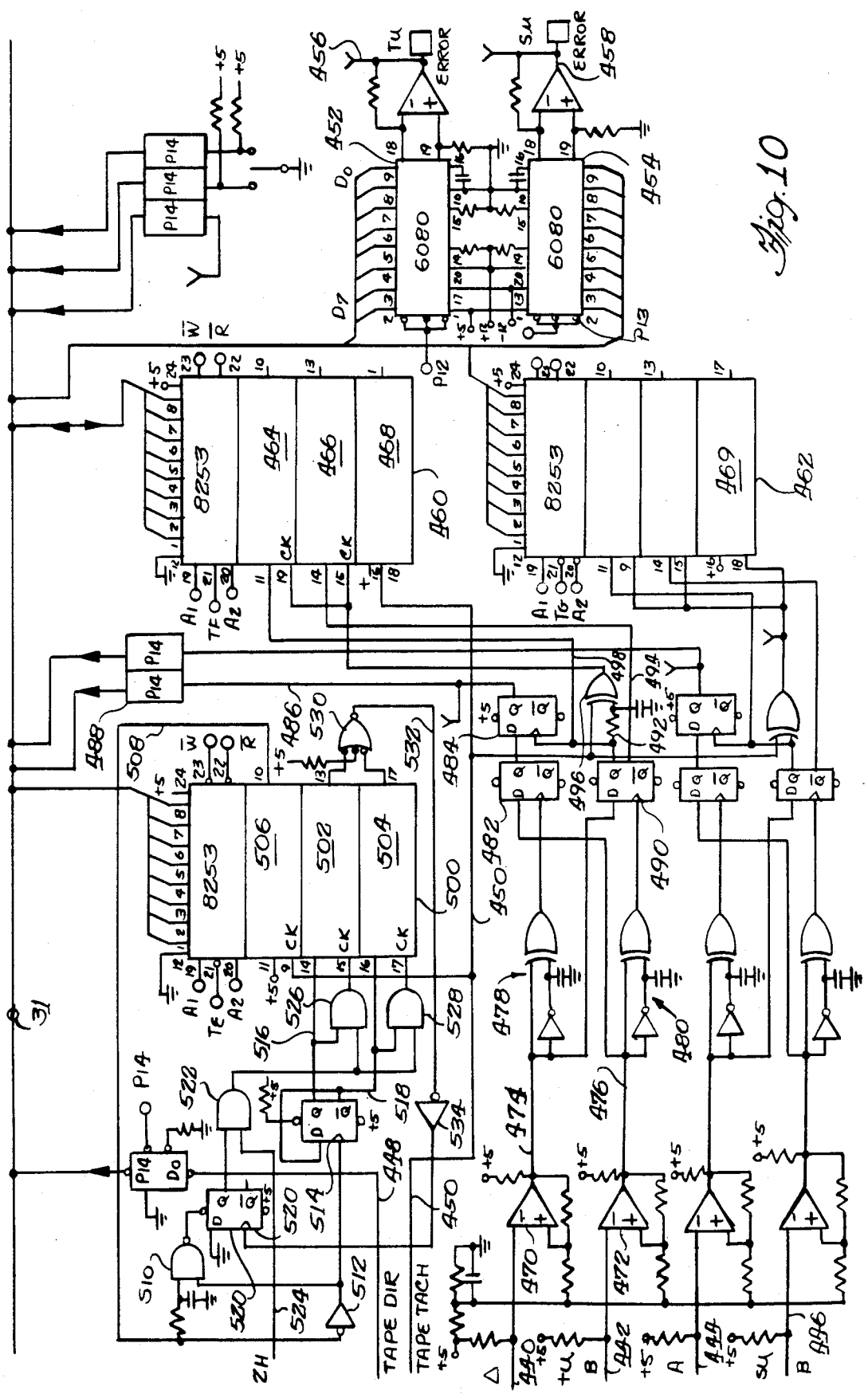
FIG. 10 is a detailed electrical schematic diagram of the reel servo circuitry of the present invention, which reel servo circuitry carries out the operation of the functional block diagrams shown in FIGS. 5 and 6; and, FIG. 11 is a detailed electrical schematic diagram of a board decode circuitry of the apparatus embodying the present invention.
Figure 11:
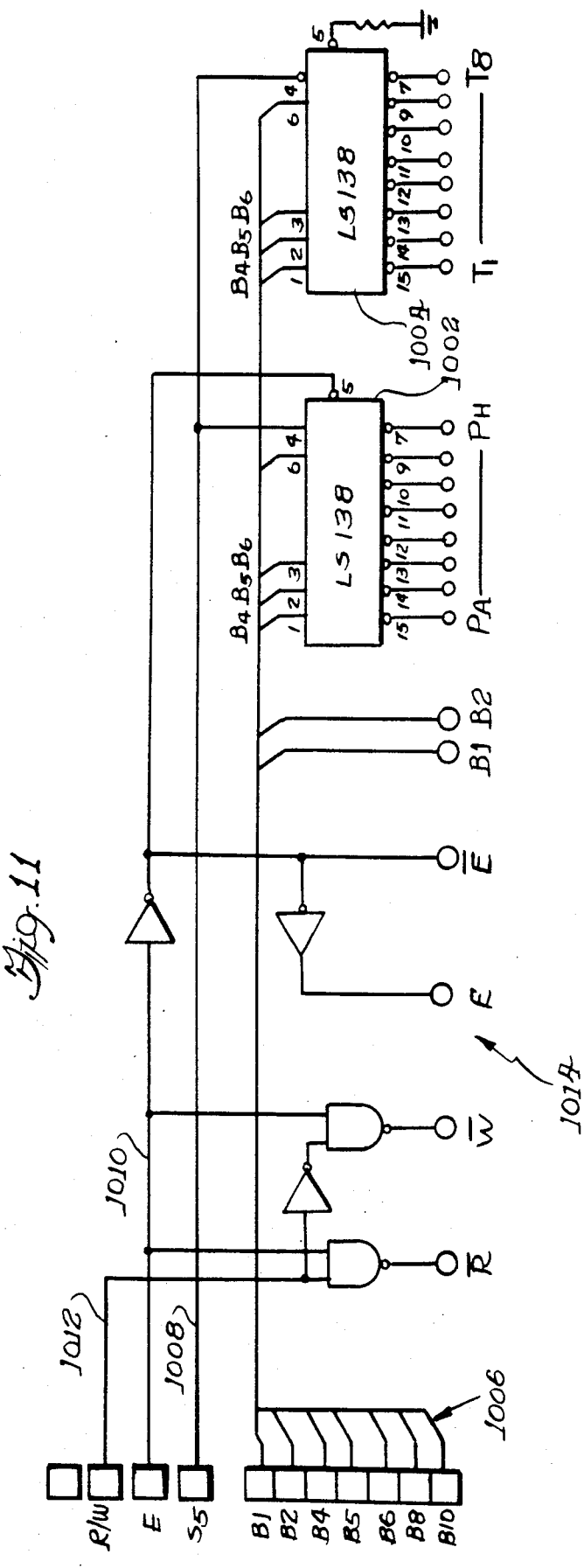

The reel servo system that has been previously described with respect to the block diagrams of FIGS. 5 and 6 is largely controlled by the microprocessor 30 together with the specific circuitry shown in FIG. 10 in accordance with the timing diagrams of FIGS. 7 and 8. Turning to the circuitry of FIG. 10, it is shown to be interconnected to the main data bus 31 via various lines and has inputs comprised of take-up reel tachometer information via lines 440 and 442, supply reel tachometer information via lines 444 and 446 as well as tape direction information from line 448 and tape tachometer information via line 450. The output signals from the microprocessor 30 are directed through the data bus 31 to digital-to-analog converters 452 and 454 which provide output drive signals to the take-up reel motor drive amplifier via line 456 and to the supply reel motor drive amplifier via line 458. As previously mentioned, the diameter of the tape packed on each reel is measured by the reel servo circuitry for the purpose of programming the torque that will be required on the reels during various operating modes. More specifically, by knowing the diameter of tape pack on the take-up reel 60 and supply reel 64, torque can be programmed so that the tension on the tape is maintained in a proper range during the various modes. It is desirable to maintain the appropriate torque so that tension is maintained at proper levels during operation. The reel tape pack diameter information is also useful in monitoring the operation of the system and if the measured reel diameter is greater than a maximum known actual value, then the microprocessor knows that something is wrong in the system. Moreover, as tape is being wound on or off one of the reels, it is known through the diameter values that it is approaching the end so that the microprocessor can slow down the reel speeds to prevent tape from flying off the reel.

The reel servo system not only is capable of measuring the diameter of tape pack on both of the take-up and supply reels, it also instantaneously determines the direction that the reels are rotating. The servo system also has information relating to the tape speed and direction and uses the tape period information for use in the automatic scan tracking servo system, particularly to assist in determining whether a track jump is to occur at the next opportunity.

Returning to the aspect of determining the tape pack diameter on the take-up and supply reels, a counter clip 460 is adapted to acquire information for determining the take-up reel tape pack diameter and a second integrated circuit counter chip 462 is adapted to supply comparable information for the supply reel. These circuits are identical and have 8-bit bidirectional data lines interconnected to the data bus 31 for communicating with the microprocessor. The counter chip 460 has two counters 464 and 466 which alternately accumulate a count of tachometer pulses from processed tape tachometer and a third counter 468 accumulates tape tachometer pulses directly from the idler 80 and therefore provides an indication of the tape speed. Since any one of the counters in the chip 460 circuit can be addressed through address lines $A_1$ and $A_2$ when enabled by the TF enable line, the microprocessor has access to the tape speed count from the counter 468 circuit and therefore the count is not needed for the same purpose in the other integrated circuit chip 462 which has comparable information relating to the supply reel. However, a counter 469 is used with the microprocessor 30 to determine supply reel speed during a tape threading operation. The counters 464 and 466 alternately accumulate a tape tachometer count which clocks the counters when they are enabled and they accumulate counts for a period corresponding to the reel tachometer period. Thus, during each rotation of the take-up reel, there will be a tape tachometer count accumulated in the counters 464 and 466 in a unique manner which will be described in connection with the timing diagrams of FIG. 7. When one counter is accumulating counts, the other effectively stores the previously accumulated count and whenever a positive-going transition occurs as a result of a tachometer pulse being produced due to rotation of the take-up reel, the counter that had been counting will be stopped and the other counter initiated. The two counters alternate their operation in this manner so that one of the counters always contains a count value that is indicative of the reel speed relative to the tape speed, thereby providing the diameter of tape pack on the reel.

The circuitry which controls the counters in FIG. 10 includes input take-up reel tachometer signals on lines 440 and 442 which are 90 degrees apart, with the inputs being applied to respective comparators 470 and 472 having respective output lines 474 and 476 which extend to respective multiply-by-two circuits 478 and 480, each of which is comprised of an EXCLUSIVE OR gate, an inverter and capacitor which operate to provide an output pulse at the EXCLUSIVE OR gate output for each edge or transition that is produced by the associated comparator. The output of the EXCLUSIVE OR for multiplier 478 triggers a D-latch 482 which has its Q output extending to the D input of another latch 484 which provides a direction value on line 486 that extends to a buffer 488 which provides a signal onto the data bus 31. The level of the line indicates the direction that the take-up reel is rotating. The output of the multiply-by-two 480 clocks another D-latch 490 which has its D input provided by line 474 and the Q output on line 492 and the $\overline{Q}$ output on line 494 of the second latch 490 provide signals for enabling either the counters 464 or 466. The Q output line 492 is also applied to an EXCLUSIVE OR gate 496 which has one input provided by the tape tachometer pulse signal on line 450. The output of the EXCLUSIVE OR 496 produces a clock signal on line 498 for clocking both counters and it clocks the enabled one at a rate corresponding to the rate of the tape tachometer signal. The use of the EXCLUSIVE OR gate 496 overcomes a problem that would arise as a result of the tape being stuck and the reels continuing to move. If the tape is stuck, there will not be a tape tachometer pulse received and then the counters 464 and 466 will not be accurate. Since the next clock pulse clears and starts the other counter, if no tape tachometer pulse is generated then the circuit operation will fail. To overcome this problem the EXCLUSIVE OR gate 496 provides a clock edge that will validate the counters in the absence of a tape tachometer pulse. The reel tachometer will provide a single clock pulse to one of the counters that will result in the counter accumulating a count of one and this is detected by the microprocessor as being an invalid condition that indicates the reels are still turning while the tape is stopped. The microprocessor then shuts down the reel motors.

The operation of the above circuitry can be more clearly understood by referring to FIG. 7. FIG. 7(1) represents an exaggerated illustration of the processed tape tachometer pulses that are received by the counters 464 and 466. FIGS. 7(2) and 7(3) illustrate the input signals on lines 498 and 494 to the two counters 464 and 466, respectively, it being appreciated that the illustration of FIG. 7(2) is the inverse of FIG. 7(3). Whenever a positive-going transition appears on either of the input lines 498 and 494, the counter receiving the positive-going edge will be reset and will begin accumulating count as shown in FIGS. 7(4) and 7(5). When a subsequent positive-going transition on the other counter input occurs, the first counter is stopped and the second counter will be cleared and begin accumulating count. The illustration of FIG. 7(2) shows a varying duration period which is shown to be exaggerated to illustrate a pronounced change in the reel tape pack diameter. The longer the duration of a level, the larger the reel tape pack size and conversely, if a very narrow or short duration level occurs, it is an indication that the reel tape pack size is smaller and would therefore accumulate a lesser count in the active counter.

If the microprocessor 30 interrogates the counters 466 and 468, it will obtain a value from both counters and it is programmed to utilize the higher count of the two. Thus, if the interrogation occurs at the point in time $P_1$, the counter 464 contains a higher count than counter 466 and the microprocessor will utilize the higher count of the counter 464 in performing its calculations. However, if the interrogation occurs at the point in time $P_2$, then counter 466 will have a larger accumulated count and it will use this value. It should be appreciated that if the reel tape pack diameter is increasing, such as would be the case for the point $P_2$, the most accurate value from counter 466 would indeed indicate that it is increasing and this information is virtually instantaneously available. Conversely, if the reel tape pack diameter is decreasing, as would occur at point in time $P_3$, the counters would be enabled and zeroed more rapidly so that the value at $P_3$ would be available very quickly, as shown in FIGS. 7(2) and 7(3). Therefore, by using the higher valued counter of the two counters, the microprocessor has available to it the pertinent information relating to reel tape pack diameter at any particular time. It should be appreciated that the circuitry for the supply reel is identical to that of the take-up reel so that the diameter of the tape on the supply reel can also be calculated at any time.

The diameter numbers that are obtained are integrated by the microprocessor to have a stable average value of the diameter of tape wrap.

In accordance with another important aspect of the invention, the reel servo circuit of, FIG. 10 also contains circuitry which measures the tape period, i.e., the inverse of the tape speed and the tape period information is used by the microprocessor primarily for predicting the ramp slope and whether a track jump operation should be accomplished at the appropriate time during each revolution of the transducing head. For this reason, the tape period circuitry is primarily used for the automatic scan tracking system, but since it utilizes the tape tachometer information for providing a clock time period it is conveniently located in the area of the circuitry which contains the reel servo circuitry.

The value of the tape period is determined in a manner very similar to that described with respect to the take-up reel tape pack diameter measurement and in this regard, the circuitry includes a counter integrated circuit chip 500 which includes two programmable counters 502 and 504 which alternately accumulate a 2H rate count via line 524 during a period of tape movement that is a function of the tape tachometer pulses on line 450. Thus, a tape tachometer signal on input line 450 is applied to the clock input of a counter 506 which is programmed to act as a divider and which divides the tachometer rate for a NTSC signal by five which output signal appears on line 508 that extends to a NAND gate 510 and to an inverter 512, the output of the inverter of which clocks a D flip-flop 514 configured as a divide-by-two having Q and $\bar{Q}$ outputs which are applied to the inputs of the counters 502 and 504 by respective lines 516 and 518. The NAND gate 510 controls a D-latch 520 and sets the same so that its Q output enables an AND gate 522 which has as its other input the clock signal on line 524 which is at a 2H rate which clocks the counters through respective AND gates 526 and 528.

During operation, the 2H clock pulses clock the appropriately enabled counter 502 or 504. Referring to FIG. 8(1), the 2H clock is shown to be exaggerated to illustrate fewer than actual number of pulses that occur. The waveform of FIG. 8(3) is the complement of that shown in FIG. 8(2). If the tape is moving rapidly, then the period of the signals in FIGS. 8(2) and 8(3) will be shorter than when the tape is moving more slowly. Thus, the waveforms shown in FIGS. 8(2) and 8(3) are exaggerated to illustrate varying rates of speed of the tape for purposes of illustration. The occurrence of a positive-going edge in either of the waveforms of FIGS. 8(2) or 8(3) will cause the appropriate counter to be reset and begin counting the number of 2H clock pulses that occur until the other counter receives an enabling positive-going edge. This causes the other counter to be reset and begin counting, and simultaneously stops the count of the previously counting counter. As is illustrated from FIGS. 8(4) and 8(5), when the tape is moving more slowly, the active counter will accumulate a larger count than when the tape is moving more rapidly.

As was the case with respect to the take-up and supply reel counters, when the microprocessor interrogates the counters 502 and 504 to determine the tape period, it will take the larger of the two counts as the accurate value. The benefit of having both counters available for the microprocessor is that they provide accurate and instantaneous information relating to the tape period. By using two counters, the larger count will be reasonably accurate and the value is immediately available for use by the microprocessor during operation.

It is also essential that the microprocessor knows when the tape has in fact stopped. The count increases as the tape slows and if the tape is stopped, then the count will eventually reach the terminal count of the counter and will roll over and begin anew. Since this would provide a count that would be incorrect, provision is made for preventing this from occurring and this is accomplished by a gate 530 having input lines provided by the output of counters 502 and 504. When either of the counters reaches terminal count, it will provide an output signal on one input of the gate 530 which in turn will provide a low output on line 532 that extends to the clock input of the D flip-flop 520 via inverter 534. The clocking of the D flip-flop 520 causes its Q output to go low and disable gate 522 which blocks the 2H frequency clock so that the counters 502 and 504 will no longer count. Since this occurs at the terminal count of the counters, the microprocessor knows by virtue of a terminal count being received upon interrogation, that in fact the tape has stopped. Once the tape moves again so that a tape tachometer pulse occurs, the signal will be applied through counter 506 to one input of gate 510 which will set the flip-flop 520 causing its Q output to go low and enable gate 522 to resume clocking of the counters 502 or 504.

```
            374        ORG   $7FF8H       ;INTERRUPT VECTOR        6081 B74160
7FF8 7322   375        FDB   IRQRT        ;INTERRUPT ROUTINE.      6084 848B
            376        ORG   $7FFCH                                6086 9722
7FFC 7341   377        FDB   SCANNER      ;NMI VECTOR
            378        ORG   $7FFEH       ;SCANNER ROUTINE.        6088 B74118
7FFE 6000   379        FDB   INTLIZE      ;RESET VECTOR            608B 8695
            391 ;......              ;INITIALIZE ROUTINE           608D 9741
6000 0F     392 INTLIZE                                            608F 861E
6001 CE0000                                                        6091 9732
6004 8655                                                          6093 863C
6006 A700                                                          6095 9731
6008 08                                                            6097 8608
6009 8C0100                                                        6099 9703
600C 26F8                                                          609B 9733
600E CE0000                                                        609D 8694
6011 A180                                                          609F 973E
6013 2622                                                          60A1 CEB050
6015 08                                                            60A4 DF3F
6016 8C0100                                                        60A6 86C6
6019 26F6                                                          60A8 9725
601B CE0000                                                        60AA B75100
601E B6AA                                                          60AD 864A
6020 A700                                                          60AF 9702
6022 08                                                            60B1 B75110
6023 8C0100                                                        60B4 9799
6026 26F8                                                          60B6 CE007F
6028 CE0000                                                        60B9 DFA4
602B A100
602D 2608                                                          60BB 863A
602F 08                                                            60BD B74406
6030 8C0100                                                        60C0 8674
6033 26F6                                                          60C2 B74406
6035 2009                                                          60C5 86BA
6037 86BF                                                          60C7 B74406
6039 972E
603B B74160                                                        60CA CE2602
603E 20C0                                                          60CD FF4400
6040 CE0000                                                        60D0 CE1800
6043 C601                                                          60D3 FF4402
6045 B680                                                          60D6 CE0014
6047 6F00                                                          60D9 FF4404
6049 18
604A 4A                                                            60DC B63A
604B 26FA                                                          60DE B74416
                                                                   60E1 8674
                                                                   60E3 B74416
```

```
604D C501
604F 2706
6051 8680
6053 5F
6054 7E6047
6057 BE80FF
605A 8680
605C B74130
605F 97A1
6061 B74210
6064 B74220
6067 B74240
606A B74250
606D 971A
606F B75150
6072 B75160
6075 B6FF
6077 9712
6079 9720
607B 9721
607D 869F
607F 972E
```

```
60E6 86B2
60EB B74416
60EB CEFFFF
60EE FF4412
60F1 DFA9

60I3 8632
60F5 B74426
60F8 8670
60FA B74426
60FD 86B4
60FF B74426
6102 CE8000
6105 FF4420

6108 8632
610A B74436
610D 8672
610F B74436
```

```
6112 B634          619F CE0004        6227 B75476        62AD DF53          632E DF65          63B3 CE8601
6114 B74446        61A2 FF5414        622A 86B4          62B0 CEE002        6330 CE000A        63B6 FF5470
6117 B67A                             622C B75476        62B3 DF55          6333 FF4424        63B9 FF5474
6119 B74446        61A5 8632          622F CE4000        62B5 CE2001        6336 CE6004
611C 86BA          61A7 B75426        6232 FF5472        62B8 DF57          6339 DF47          63BC 861E
611E B74446        61AA 8672                             62BA CE4000        633B CE6004        63BE 970E
6121 CEFFFF        61AC B75426        6235 B64170        62BD DF59          633E DF49          63C0 B74150
6124 FF4442        61AF 86BA          6238 8580          62BF CEC003                           63C3 CED804
6127 CEFFFF        61B1 B75426        623A 2603          62C2 DF5B          6340 CE0120        63C6 DF0F
612A FF4444                           623C 7E6315                           6343 FF4430        63C8 CE5804
                   61B4 8632                             62C4 CE8000        6346 DF4B          63CB DF1C
612D B634          61B6 B75436        623F CE1027        62C7 FF5450        6348 CE6842        63CD 863C
612F B74456        61B9 8672          6242 FF4410                           634B FF4432        63CF 9763
6132 8674          61BB B75436        6245 DF61                                                63D1 8607
6134 B74456        61BE 86B2          6247 CEA04D        62CA CE9804        634E CE0500        63D3 9764
6137 86B8          61C0 B75436        624A DF7F          62CD FF5462        6351 FF4448        63D5 B621
6139 B74456        61C3 CE0003        624C CE8890        62D0 DF5D                             63D7 972A
                   61C6 FF5430        624F FF4414        62D2 CE4C02        6354 CE267F        63D9 8676
613C CEFFFF        61C9 CEC002                           62D5 DF5F          6357 FF5480        63DB 979D
613F FF4450        61CC FF5434        6252 CE704E        62D7 CE9804        635A CE4083        63DD 8690
6142 CEFFFF                           6255 FF4422        62DA FF5464        635D FF5402        63DF 979E
6145 FF4452        61CF 8632          6258 DF65                                                63E1 CE7480
6148 CEFFFF        61D1 B75446        625A CE000A        62DD CE3301        6360 CEA53E        63E4 DF16
614B FF4454        61D4 8672          625D FF4424        62E1 FF5470        6363 FF5420        63E6 DF3B
                   61D6 B75446        6260 CE9804        62E3 FF5474        6366 CE804B        63E8 960E
614E B634          61D9 86B2          6263 DF47                             6369 FF5422        63EA 84E3
6151 B74466        61DB B75446        6265 CE9804        62E6 B69E          636C CEEE00        63EC 970E
6153 8674          61DE CE0300        6268 DF49          62E8 970E          636F FF5424
6155 B74466        61E1 FF5440                           62EA B74150        6372 DF4D          63EE B74150
6158 86B8          61E4 CE3000        626A CE6125        62ED CEE304        6374 CE4E00        63F1 BA1C
615A B74466                           626D FF4430        62F0 DF0F          6377 DF4F          63F3 970E
615D CEFFFF        61E7 FF5442        6270 DF4B          62F2 CE6304                           63F5 B74150
6160 FF4460        61EA CE3000                           62F5 DF1C          6379 CE8E01
```

| | | | | | |
|---|---|---|---|---|---|
| 6163 CEFFFF | 61ED FF5444 | 6272 CE204E | 62F7 8657 | 637C DF51 | |
| 6166 FF4462 | | 6275 FF4432 | 62F9 9763 | | |
| 6169 CEFFFF | 61F0 863A | | 62FB 8607 | 637E CE9001 | |
| 616C FF4464 | 61F2 B75456 | 6278 CE0600 | 62FD 9764 | 6381 FF5432 | |
| | 61F5 8632 | 627B FF4440 | 62FF 8627 | 6384 DF53 | 63F8 1E |
| 616F B632 | 61F7 B75456 | | 6301 972A | 6386 CE3002 | 63F9 B64120 |
| 6171 B75406 | 61FA 86B6 | 627E CE289B | 6303 B6BD | 6389 DF55 | 63FC 9124 |
| 6174 8674 | 61FC B75456 | 6281 FF5430 | 6305 979D | 638B CEF000 | 63FE 270E |
| 6176 B75406 | 61FF CE0500 | 6284 CE409C | 6307 86AB | 638E DF57 | 6400 9724 |
| 6179 B6B2 | 6202 FF5452 | 6287 FF5402 | 6309 979E | 6390 CE5000 | 6402 962E |
| 617B B75406 | 6205 CE4000 | | 630B CE7460 | 6393 DF59 | 6404 BA1F |
| 617E CEFF08 | 6208 FF5454 | 628A CE2C4B | 630E DF16 | 6395 CED002 | 6406 972E |
| 6181 FF5404 | | 628D FF5420 | 6311 DF3B | 6398 DF5B | 6408 B74160 |
| | 620B 8636 | 6290 CEA04C | 6312 7E63E8 | | 640B 7E6319 |
| 6184 8632 | 620D B75466 | 6293 FF5422 | | 639A CEB000 | 640E 5F |
| 6186 B75416 | 6211 8674 | 6296 CE7E01 | 6315 CED020 | 639D FF5450 | 640F B111 |
| 6189 8674 | 6212 B75466 | 6299 FF5424 | 6318 FF4410 | | 6411 2416 |
| 618B B75416 | 6215 86B4 | 629C DF4D | 631B DF61 | 63A0 CE6004 | 6413 48 |
| 618E 86BA | 6217 B75466 | 629E CE9E00 | 631D CE2041 | 63A3 FF5462 | 6414 C900 |
| 6191 B75416 | 621A CE4005 | 62A1 DF4F | 6320 DF9F | 63A6 DF5D | 6416 CE6435 |
| 6193 CE7B00 | 621D FF5460 | 62A3 CE5E02 | 6322 CE3075 | 63A8 CE3002 | 6419 DF00 |
| 6196 FF5410 | | 62A6 DF51 | 6325 FF4414 | 63AB DF5F | 641B 9B01 |
| 6199 CE0400 | 6220 8634 | | | 63AD CE6004 | 641D 9701 |
| 619C FF5412 | 6222 B75476 | 62A8 CE0002 | 6328 CE0942 | 63B0 FF5464 | 641F D900 |
| | 6225 8672 | 62AB FF5432 | 632B FF4422 | | 6421 D700 |

| | | | | | | |
|---|---|---|---|---|---|---|
| 6423 DE00 | 649D 7E648C | 6521 7E6547 | 659F BD721A | 6620 27D4 | 669D B64100 | |
| 6425 EE00 | 64A0 C653 | 6524 8680 | 65A2 7E658B | 6622 9698 | 66A0 B64110 | |
| 6427 6E00 | 64A2 BD71A4 | 6526 7E6519 | 65A5 D61A | 6624 B137 | 66A3 B64120 | |
| 6429 962E | 64A5 BD7000 | 6529 9621 | 65A7 CB00 | 6626 25EB | 66A6 B64130 | |
| 642B BA9F | 64A8 BD7279 | 652B 8A10 | 65A9 D705 | 6628 9632 | 66A9 B64140 | |
| 642D 972E | 64AB 9621 | 652D 9721 | 65AB 9105 | 662A 8B74 | 66AC B64150 | |
| 642F B74160 | 64AD 8A01 | 652F 7E6547 | 65AD 2503 | 662C 771A | 66AF B64160 | |
| 6432 7E6987 | 64AF 9721 | 6532 9621 | 65AF 7E6587 | 662E 9622 | 66B2 B64170 | |
| | 64B1 8680 | 6534 B4EF | 65B2 17 | 6630 D635 | 66B5 B64200 | |
| 6435 6457 | 64B3 97A6 | 6536 9721 | 65B3 7E6587 | 6632 D114 | 66B8 B64210 | |
| 6437 645A | 64B5 7E648C | 6538 7E6547 | 65B6 C658 | 6634 2239 | 66BB B64220 | |
| 6439 64BB | | 653B D621 | 65B8 D167 | 6636 D636 | 66BE B64230 | |
| 643B 64C9 | 64B8 BD71AF | 653D C510 | 65BA 2405 | 6638 2635 | 66C1 B64240 | |
| 643D 64E9 | 64BB 962E | 653F 27D4 | 65BC 3678 | 663A C08A | 66C4 B64250 | |
| 643F 65CA | 64BD 8480 | 6541 9631 | 65BE 7E6587 | 663C D714 | 66C7 B64260 | |
| 6441 669A | 64BF 8A02 | 6543 B137 | 65C1 D621 | 663E BAC0 | 66CA B64270 | |
| 6443 66EF | 64C1 972E | 6545 25EB | 65C3 C4FB | 6640 9722 | 66CD B65100 | |
| 6445 66FC | 64C3 B74160 | 6547 8678 | 65C5 D721 | 6642 B74110 | 66D0 B65110 | |
| 6447 683E | 64C6 7E64B8 | 6549 971A | 65C7 7E6580 | 6645 D621 | 66D3 B65120 | |
| 6449 68C8 | | 654B 9622 | | 6647 C501 | 66D6 B65130 | |
| 644B 68DF | 64C9 BD70AF | 654D 84C0 | 65CA BD71AF | 6649 2638 | 66D9 B65140 | |
| 644D 696F | 64CC 5A | 654F 8140 | 65CD 9612 | 664B 9611 | 66DC B65150 | |
| 644F 6987 | 64CD F74210 | 6551 2706 | 65CF 8502 | 664D B74250 | 66DF B65160 | |
| 6451 6A0C | 64D0 F74220 | 6553 9621 | 65D1 270F | 6650 81F7 | 66E2 B65170 | |
| 6453 6A1E | 64D3 F74240 | 6555 6A14 | 65D3 BD710A | 6652 2425 | 66E5 B686 | |
| 6455 6A3A | 64D6 F74250 | 6557 9721 | 65D6 BD71D2 | 6654 8118 | 66E7 972E | |
| | 64D9 F75160 | 6559 9622 | 65D9 9620 | 6656 2526 | 66E9 B74160 | |
| 6457 7E645A | 64DC F75150 | 655B B47F | 65DB 8502 | 6658 BD72BB | 66EC 7E669A | |

| | | | | | | |
|---|---|---|---|---|---|---|
| | 64DF 8683 | 655D 8A40 | 65DD 2703 | 665B F64260 | | |
| 645A BD70AF | 64E1 972E | 655F 9722 | 65DF 7E65CA | 665E C501 | 66EF BD70AF | |
| 645D BD71D2 | 64E3 B74160 | 6561 B74110 | 65E2 C637 | 6660 2727 | 66F2 8607 | |
| 6460 9612 | 64E6 7E64C9 | 6564 D621 | 65E4 BD71A4 | 6662 B74240 | 66F4 972E | |
| 6462 8502 | | 6566 C501 | 65E7 BD7000 | 6665 8605 | 66F6 B74160 | |
| 6464 270C | 64E9 BD70AF | 6568 2635 | 65EA B64140 | 6667 972E | 66F9 7E66EF | |
| 6466 BD710A | 64EC 9612 | 656A 9C11 | 65ED 9123 | 6669 B74160 | | |
| 6469 9620 | 64EE 8502 | 656C B74250 | 65EF 272B | 666C 7E65CA | 66FC BD70AF | |
| 646B 8502 | 64F1 271F | 656F B1F7 | 65F1 9723 | 666F 843F | 66FF BD71D2 | |
| 646D 2703 | 64F2 BD710A | 6571 2422 | 65F3 7E65E2 | 6671 BA80 | 6702 9612 | |
| 646F 7E645A | 64F5 BD71D2 | 6573 8120 | 65F6 8180 | 6673 C601 | 6704 8502 | |
| 6472 9630 | 64F8 9620 | 6575 2523 | 65F8 250B | 6675 D714 | 6706 270C | |
| 6474 8520 | 64FA 8502 | 6577 BD72BB | 65FA 9723 | 6677 20C7 | 6708 BD710A | |
| 6476 2723 | 64FC 2703 | 657A D621 | 65FC 9698 | 6679 86FF | 670B 9620 | |
| 6478 C6B3 | 64FE 7E64E9 | 657C C504 | 65FE 813C | 667B 7E6662 | 670D 8502 | |
| 647A BD71A4 | 6501 C637 | 657E 2636 | 6600 2408 | 667E 8600 | 670F 2703 | |
| 647D BD7000 | 6503 BD71A4 | 6581 F64260 | 6602 7E6628 | 6680 7E6662 | 6711 7E6832 | |
| 6480 D621 | 6506 BD7000 | 6583 C501 | 6605 8680 | 6683 BD721A | 6714 D621 | |
| 6482 C501 | 6509 B64140 | 6585 261E | 6607 7E65FA | 6686 7E6665 | 6716 C501 | |
| 6484 2614 | 650C 9123 | 6587 43 | 660A 9621 | 6689 D61A | 6718 2648 | |
| 6486 BD7305 | 650E 272B | 6588 B74240 | 660C BA20 | 668B CB1B | 671A BD730B | |
| 6489 B74250 | 6510 9723 | 658B 8604 | 660E 9721 | 668D D705 | 671D B74250 | |
| 648C 962E | 6512 7E6501 | 658D 972E | 6610 7E6620 | 668F 9105 | 6720 8636 | |
| 648E 8480 | 6515 8180 | 658F B74160 | 6613 9621 | 6691 2503 | 6722 910B | |
| 6490 8A01 | 6517 250B | 6592 7E64E9 | 6615 B4DF | 6693 7E6662 | 6724 2742 | |
| 6492 972E | 6519 9723 | 6595 8600 | 6617 9721 | 6696 17 | 6726 960E | |
| 6494 B74160 | 651B 9631 | 6597 7E6587 | 6619 7E6628 | 6697 7E6662 | 6728 84FC | |
| 6497 7E645A | 651D 813C | 659A B6FF | 661C D621 | | 672A BA40 | |
| 649A BD721A | 651F 2408 | 659C 7E6587 | 661E C520 | 669A BD70AF | 672C 970E | |

| | | | | | |
|---|---|---|---|---|---|
| 672E B74150 | 67AF DE14 | 6828 DE14 | 68A5 2715 | 6927 CE10FF | 69A9 B74150 |
| 6731 8640 | 67B1 FF4410 | 682A FF4412 | 68A7 960E | 692A 89 | 69AC 9612 |
| 6733 972D | 67B4 9630 | 682D DFA9 | 68A9 84FD | 692B 26FD | 69AE 8A03 |
| 6735 C6B3 | 67B6 8501 | 682F 7E6779 | 68AB 8A40 | 692D BD70E2 | 69B0 9712 |
| 6737 BD7000 | 67B8 26E0 | 6832 962E | 68AD 970E | 6930 7E6959 | 69B2 86FF |
| 673A 7A0003 | 67BA C693 | 6834 8A1F | 68AF B74150 | 6933 BD721A | 69B4 B74220 |
| 673D 2703 | 67BC BD7000 | 6836 972E | 68B2 B609 | 6936 7E6959 | 69B7 8680 |
| 673F 7E6832 | 67BF D630 | 6838 B74160 | 68B4 972E | 6939 DEA9 | 69B9 B74210 |
| 6742 8636 | 67C1 C502 | 683B 7E66FC | 68B6 B74160 | 693B 9C0F | 69BC B65140 |
| 6744 900B | 67C3 273E | | 68B9 7E683E | 693D 2603 | 69BF 8540 |
| 6746 2406 | 67C5 B64170 | 683E BD70AF | 68BC 960E | 693F 7E6965 | 69C1 273A |
| 6748 7A003B | 67C8 C504 | 6841 BD71D2 | 68BE B4BC | 6942 DE0F | 69C3 8580 |
| 674B 7A000B | 67CA 2613 | 6844 9612 | 68C0 970E | 6944 FF4412 | 69C5 2731 |
| 674E 7C090B | 67CC 43 | 6846 8502 | 68C2 B74150 | 6947 DFA9 | 69C7 C65B |
| 6751 D60B | 67CD 8387 | 6848 270C | 68C5 7E68B2 | 6949 DE61 | 69C9 D702 |
| 6753 53 | 67CF 8580 | 684A BD710A | | 694B FF4410 | 69CB F75110 |
| 6754 54 | 67D1 2613 | 684D 9620 | 68C8 BD70AF | 694E 960E | 69CE D799 |
| 6755 54 | 67D3 8540 | 684F 8502 | 68CB B64140 | 6950 84FE | 69D0 86B0 |
| 6756 54 | 67D5 271D | 6851 2703 | 68CE 919A | 6952 BA42 | 69D2 B75460 |
| 6757 54 | 67D7 8520 | 6853 7E683E | 68D0 2704 | 6954 970E | 69D5 8680 |
| 6758 54 | 67D9 2713 | 6856 D621 | 68D2 979A | 6956 B74150 | 69D7 B75160 |
| 6759 50 | 67DB CE1F05 | 6858 C501 | 68D4 20F2 | 6959 962E | 69DA DE53 |
| 675A D703 | 67DE FF4412 | 685A 2617 | 68D6 860A | 695B 8A1F | 69DC FF5432 |

| | | | | | |
|---|---|---|---|---|---|
| 675C BD70E2 | 67E1 DFA9 | 685C BD730B | 68D8 972E | 695D 972E | 69DF DE4D |
| 675F 7E66FC | 67E3 7E6779 | 685F B74250 | 68DA B74160 | 695F B74160 | 69E1 FF5424 |
| 6762 BD721A | 67E6 8508 | 6862 C6B3 | 68DD 20E9 | 6962 7E68DF | 69E4 BD703D |
| 6765 7E6832 | 67E8 27E9 | 6864 BD7800 | | 6965 860B | 69E7 BD7279 |
| 6768 DE0F | 67EA 8510 | 6867 B64140 | 68DF BD70AF | 6967 972E | 69EA 962E |
| 676A FF4412 | 67EC 26ED | 686A 9123 | 68E2 C653 | 6969 B74160 | 69EC 8480 |
| 676D DFA9 | 67EE CE9F04 | 686C 270B | 68E4 BD7000 | 696C 7E68DF | 69EE 8A0D |
| 676F CED1FF | 67F1 7E67DE | 686E 9723 | 68E7 BD720C | | 69F1 972E |
| 6772 DF03 | 67F4 DE1E | 6870 7E6856 | 68EA 9612 | 696F BD70AF | 69F2 B74160 |
| 6774 CE13F6 | 67F6 2705 | 6873 BD721A | 68EC 8502 | 6972 C653 | 69F5 7E6987 |
| 6777 DF1E | 67F8 09 | 6876 7E68B2 | 68EE 270F | 6974 BD7000 | 69F8 C673 |
| 6779 BD71D2 | 67F9 DF1E | 6879 970C | 68F1 BD710A | 6977 BD7305 | 69FA 7E69FF |
| 677C 9612 | 67FB 2006 | 687B 960C | 68F3 BD720C | 697A B74250 | 69FD C6F3 |
| 677E B502 | 67FD 9630 | 687D 910B | 68F6 9620 | 697D 860C | 69FF D702 |
| 6780 2703 | 67FF B4FD | 687F 2720 | 68F8 8502 | 697F 972E | 6A01 F75110 |
| 6782 7E66FC | 6801 9730 | 6881 7A0003 | 68FA 2703 | 6981 B74160 | 6A04 D799 |
| 6785 BD730B | 6803 DE03 | 6884 261B | 68FC 7E6959 | 6984 7E696F | 6A06 BD7000 |
| 6788 B74250 | 6805 2705 | 6886 900B | 68FF D621 | | 6A09 7E69DA |
| 678B BD70AF | 6807 09 | 6888 2406 | 6901 C501 | 6987 BD70AF | |
| 678E B64140 | 6808 DF03 | 688A 7A000B | 6903 262E | 698A 9621 | 6A0C BD70AF |
| 6791 9123 | 680A 2010 | 688D 7A000B | 6905 BD730B | 698C BA01 | 6A0F B64140 |
| 6793 2709 | 680C 961E | 6891 7C000B | 6908 B74250 | 698E B4FD | 6A12 972F |
| 6795 9723 | 680E 8A03 | 6893 D60B | 690B 961E | 6990 7721 | 6A14 860E |
| 6797 7E678B | 6810 970E | 6895 53 | 690D B4FC | 6992 9620 | 6A16 972E |
| 679A C653 | 6812 B74150 | 6896 54 | 690F 8A40 | 6994 8A1F | 6A18 B74160 |
| 679C 201E | 6815 8618 | 6897 54 | 6911 970E | 6996 9720 | 6A1B 7E6A0C |
| 679E 9705 | 6817 972E | 6898 54 | 6913 B74150 | 6998 8680 | |
| 67A0 8640 | 6819 B74160 | 6899 54 | 6916 960B | 699A 97A6 | 6A1E BD70AF |
| 67A2 9706 | 681C C600 | 689A 54 | 6918 8136 | 699C 960E | 6A21 B64140 |
| 67A4 BD70CE | 681E 961B | 689B 5C | 691A 271D | 699E 84AE | 6A24 9130 |
| 67A7 CB80 | 6820 9B1C | 689C D703 | 691C 2406 | 69A0 970E | 6A26 2704 |
| 67A9 B900 | 6822 9714 | 689E BD70E2 | 691E 7C000B | 69A2 B74150 | 6A28 9730 |
| 67AB 9715 | 6824 D91D | 68A1 960B | 6921 7C000B | 69A5 8A36 | 6A2A 20F2 |
| 67AD D714 | 6826 D715 | 68A3 B1FF | 6924 7A000B | 69A7 970E | 6A2C 962E |

| | | | | | |
|---|---|---|---|---|---|
| 6A2E 8480 | 702F 9621 | 70A3 8680 | 710A 9620 | 7186 B74250 | 71F5 9706 |
| 6A30 8A0F | 7031 8A80 | 70A5 B75160 | 710C 8501 | 7189 86FF | 71F7 BD70CE |
| 6A32 972E | 7033 9721 | 70A8 9621 | 710E 2738 | 718B B74220 | 71FA DB4B |
| 6A34 B74160 | 7035 B65140 | 70AA 847F | 7110 8510 | 718E 9712 | 71FC 994C |
| 6A37 7E6A1E | 7038 8580 | 70AC 9721 | 7112 2725 | 7190 962E | 71FE 8004 |
| | 703A 2701 | 70AE 39 | 7114 960E | 7192 84DF | 7200 D739 |
| 6A3A BD70AF | 703C 39 | | 7116 84DF | 7194 8AC0 | 7202 973A |
| 6A3D C653 | 703D B65140 | 70AF B64120 | 7118 B74150 | 7196 972E | 7204 0F |
| 6A3F BD7000 | 7040 841F | 70B2 9124 | 711B 970E | 7198 B74160 | 7205 DE39 |
| 6A42 BD720C | 7042 9705 | 70B4 2717 | 711D CE1E00 | 719B 9620 | 7207 FF4430 |
| 6A45 DEA9 | 7044 8620 | 70B6 D621 | 7120 DFAB | 719D 84F7 | 720A 0E |
| 6A47 9C0F | 7046 9706 | 70B8 C502 | 7122 9612 | 719F 8A16 | 720B 39 |
| 6A49 2707 | 7048 BD70CE | 70BA 260C | 7124 8501 | 71A1 9723 | 720C 9630 |
| 6A4B DE0F | 704B CB48 | 70BC 8680 | 7126 2716 | 71A3 39 | 720E 8501 |
| 6A4D FF4412 | 704D 8900 | 70BE B74240 | 7128 8680 | | 7210 26C6 |
| 6A50 DFA9 | 704F D743 | 70C1 B74250 | 712A B74210 | 71A4 960B | 7212 0F |
| 6A52 D621 | 7051 9744 | 70C4 CA02 | 712D 8640 | 71A6 81FF | 7213 DE4B |
| 6A54 C501 | 7053 39 | 70C6 D721 | 712F B74220 | 71A8 2612 | 7215 FF4430 |
| 6A56 2619 | 7054 9621 | 70C8 33 | 7132 9620 | 71AA DE1E | 7218 0E |
| 6A58 BD730B | 7056 8580 | 70C9 33 | 7134 84FE | 71AC 2620 | 7219 39 |

| | | | | | |
|---|---|---|---|---|---|
| 6A5B B74250 | 7058 2601 | 70CA 7E63F8 | 7136 9720 | 71AE 960E | |
| 6A5E 8610 | 705A 39 | 70CD 39 | 7138 39 | 71B0 B4BE | 721A 962E |
| 6A60 972E | 705B B6B0 | | 7139 CE01FF | 71B2 8A02 | 721C 847F |
| 6A62 B74160 | 705D B75466 | 70CE 4F | 713C 20E2 | 71B4 970E | 721E 972E |
| 6A65 7E6A3A | 7060 8680 | 70CF 5F | 713E 8680 | 71B6 B74150 | 7220 B74160 |
| 6A68 BD721A | 7062 B75160 | 70D0 CE0008 | 7140 B74210 | 71B9 C4F7 | 7223 C694 |
| 6A6B 7E6A5E | 7065 C680 | 70D3 58 | 7143 86FF | 71BB 39 | 7225 D73E |
| | 7067 86A0 | 70D4 49 | 7145 B74220 | 71BC B6FF | 7227 D667 |
| | 7069 B75160 | 70D5 780005 | 7148 7E7132 | 71BE 970B | 7229 C1B0 |
| | 706C 5A | 70D8 2404 | 714B 9620 | 71C0 CEFFFF | 722B 2406 |
| | 706D C180 | 70DA DB06 | 714D B508 | 71C3 FF4412 | 722D D621 |
| | 706F 26FB | 70DC 8930 | 714F 271D | 71C6 DFA9 | 722F C4FE |
| | 7071 8670 | 70DE 09 | 7151 8510 | 71C8 CE0308 | 7231 D721 |
| 7000 0F | 7073 B75160 | 70DF 25F2 | 7153 2711 | 71CB DF1E | 7233 8682 |
| 7001 9630 | 7076 5C | 70E1 39 | 7155 8502 | 71CD 39 | 7235 B74240 |
| 7003 8501 | 7077 C180 | | 7157 260D | 71CE 09 | 7238 96A6 |
| 7005 2702 | 7079 26FB | 70E2 960B | 7159 8504 | 71CF DF1E | 723A DEA4 |
| 7007 CA40 | 707B 8638 | 70E4 9705 | 715B 2709 | 71D1 39 | 723C 09 |
| 7009 8520 | 707D B75160 | 70E6 9706 | 715D 84FB | | 723D 2604 |
| 700B 2614 | 7080 5A | 70EB BD70CE | 715F 9720 | | 723F 4C |
| 700D CA40 | 7081 C100 | 70EB 9705 | 7161 CE2CD4 | 71D2 9630 | 7240 CE007F |
| 700F C4DB | 7083 26FB | 70ED D60B | 7164 2905 | 71D4 8501 | 7243 DFA4 |
| 7011 C47F | 7085 B67C | 70EF D786 | 7166 DEAB | 71D6 2711 | 7245 C680 |
| 7013 D702 | 7087 B75160 | 70F1 BD70CE | 7168 2704 | 71D8 BD70CE | 7247 F74466 |
| 7015 D699 | 708A 5C | 70F4 DB63 | 716A 09 | 71DB D69A | 724A FE4464 |
| 7017 C47F | 708B C180 | 70F6 9964 | 716B DFAB | 71DD 54 | 724D DFA2 |
| 7019 D799 | 708D 26FB | 70F3 2402 | 716D 39 | 71DE 4F | 724F 7300A2 |
| 701B F75110 | 708F 8682 | 70FA B6FF | 716E 960E | 71DF DB4B | 7252 D6A2 |
| 701E 0E | 7091 B75160 | 70FC 44 | 7170 B4AE | 71E1 994C | 7254 D1A7 |
| 701F 2033 | 7094 5A | 70FD 56 | 7172 B74150 | 71E3 C040 | 7256 2709 |
| 7021 B65130 | 7095 C100 | 70FE 9703 | 7175 970E | 71E5 8200 | 7258 D7A7 |
| 7024 B502 | 7097 26FB | 7100 D707 | 7177 8A3E | 71E7 2017 | 725A 4A |
| 7026 27E9 | 7099 B67F | 7102 DE07 | 7179 B74150 | 71E9 5F | 725B CEFFFF |
| 7028 C580 | 709B B75160 | 7104 FF4412 | 717C 970E | 71EA B64200 | 725E FF4464 |
| 702A 27E5 | 709E 5C | 7107 DFA9 | 717E 8680 | 71ED 841F | 7261 81A0 |
| 702C D702 | 709F C180 | 7109 39 | 7180 B74210 | 71EF B801 | 7263 240F |
| 702E 0E | 70A1 26FB | | 7183 B74240 | 71F1 9705 | 7265 8180 |
| | | | | 71F3 B620 | |

| | | | | | |
|---|---|---|---|---|---|
| 7267 2506 | 72D2 BD70CE | | 7338 BA08 | | 73B5 7E73DA |
| 7269 97A6 | 72D5 8100 | | 733A B74150 | | 73B8 B680 |
| 726B B74250 | 72D7 261D | | 733D 0E | | 73BA 972E |
| 726E 39 | 72D9 17 | | 733E 7E745A | | 73BC 8640 |
| 726F 8680 | 72DA 9B1A | | 7341 960E | 2000 SCANNER | 73BE D612 |
| 7271 7E7269 | 72DC 2518 | | 7343 84E7 | | 73C0 CA03 |
| 7274 86A0 | 72DE 39 | | 7345 B74150 | | 73C2 D712 |
| 7276 7E7269 | 72DF D619 | | 7348 BA10 | | 73C4 9727 |
| | 72E1 D018 | | 734A B74150 | | 73C6 9625 |
| 7279 9667 | 72E3 D705 | | 734D 970E | | 73C8 8520 |
| 727B 81D0 | 72E5 B618 | | 734F 0E | | 73CA 26E5 |
| 727D 2426 | 72E7 9706 | | 7350 3E | | 73CC 9612 |
| 727F 8682 | 72E9 BD70CE | | 7351 3B | | 73CE 8580 |
| 7281 B74240 | 72EC 8100 | | 7352 8640 | | 73D0 2708 |
| 7284 962E | 72EE 2609 | | 7354 B74426 | | 73D2 8520 |
| 7286 847F | 72F0 961A | | 7357 B74436 | | 73D4 2614 |
| 7288 972E | 72F2 10 | | 735A FE4422 | | 73D6 D62D |
| 728A B74160 | 72F3 2504 | | 735D DF28 | | 73D8 2605 |

| | | | | | |
|---|---|---|---|---|---|
| 728D D63E | 72F5 39 | | 735F FE4432 | | 73DA B75110 |
| 728F 7A0014 | 72F6 86FF | | 7362 DF26 | | 73DD 9799 |
| 7292 260B | 72F8 39 | | 7364 B64170 | | 73DF B6B4 |
| 7294 8671 | 72F9 8600 | | 7367 DE65 | | 73E1 B74426 |
| 7296 9714 | 72FB 39 | | 7369 FF4422 | | 73E4 DE47 |
| 7298 5A | 72FC D623 | | 736C 8502 | | 73E6 FF4424 |
| 7299 C175 | 72FE DB35 | | 736E 2748 | | 73E9 DE49 |
| 729B 2402 | 7300 25F7 | | 7370 9629 | | 73EB FF4424 |
| 729D C675 | 7302 7E72F0 | | 7372 2711 | | 73EE 8674 |
| 729F F74250 | | | 7374 8680 | | 73F1 B75466 |
| 72A2 D73E | 7305 9632 | | 7376 9726 | | 73F3 9612 |
| 72A4 39 | 7307 44 | | 7378 86FF | | 73F5 8580 |
| 72A5 B680 | 7308 7E730F | | 737A D612 | | 73F7 2723 |
| 72A7 B74250 | 730B 9632 | | 737C C4FE | | 73F9 B65140 |
| 72AA B74240 | 730D BB0A | | 737E CA02 | | 73FC 8540 |
| 72AD C694 | 730F 8B80 | | 7380 D712 | | 73FE 2613 |
| 72AF D73E | 7311 B74240 | | 7382 7E73C4 | | 7400 7E741C |
| 72B1 962E | 7314 9622 | | 7385 9627 | | 7403 DE5F |
| 72B3 8A80 | 7316 843F | | 7387 912A | | 7405 FF5462 |
| 72B5 972E | 7318 8A80 | | 7389 270E | | 7408 DE5D |
| 72B7 B74160 | 731A 9722 | | 738B 2407 | | 740A FF5462 |
| 72BA 39 | 731C B74110 | | 738D B600 | | 740D 85B4 |
| | 731F 9611 | | 738F 9726 | | 740F B75466 |
| | 7321 39 | | 7391 7E739E | | 7412 DE43 |
| | | | 7394 B6FF | | 7414 FF5464 |
| | | | 7396 7E738F | | 7417 DE5D |
| | | | 7399 9626 | | 7419 FF5464 |
| 72BB D635 | | | 739B 7E738F | | 741C DE3B |
| 72BD D719 | | | 739E 9628 | | 741E DF16 |
| 72BF D636 | 7322 9622 | 1986 IRQRT | 73A0 D612 | | 7420 9626 |
| 72C1 2639 | 7324 972B | | 73A2 C4FD | | 7422 B74210 |
| 72C3 9623 | 7326 B64170 | | 73A4 D712 | | 7425 9627 |
| 72C5 43 | 7329 8504 | | 73A6 D620 | | 7427 B74220 |
| 72C6 9718 | 732B 2714 | | 73A8 CA0D | | 742A 9602 |
| 72C8 9019 | 732D 8501 | | 73AA C4EF | | 742C 8580 |
| 72CA 2513 | 732F 2721 | | 73AC D720 | | 742E 271E |
| 72CC 9705 | 7331 960E | | 73AE 7E73C4 | | 7430 9625 |
| 72CE 8608 | 7333 84F7 | | 73B1 9602 | | 7432 BA11 |
| 72D0 9706 | 7335 B74150 | | 73B3 BA20 | | 7434 B75100 |
| 7437 B4FE | 74A4 BD76C4 | 752F 7C002D | 75B8 7E757B | 7641 CE7478 | 76B7 F75160 |
| 7439 9725 | 74A7 CE7482 | 7532 CE7496 | | 7644 7E757B | 76BA 39 |
| 743B B75100 | 74AA 7E757B | 7535 7E757B | 75BB BD7680 | | 76BB C680 |
| 743E 960E | | 7538 762D | 75BE CE7466 | 7647 BD7680 | 76BD 7E76B7 |
| 7440 B4FB | 74AD BD7680 | 753A 27F6 | 75C1 7E757B | 764A BD76E7 | 76C1 5C |
| 7442 B74150 | 74B1 BD775B | 753C 7A002D | | 764D BD76C4 | 76C1 7E76B7 |
| 7445 BACC | 74B3 CE7484 | 753F 7E7532 | 75C4 BD7680 | 7650 CE747A | |
| 7447 B74150 | 74B6 7E757B | | 75C7 BD76E7 | 7653 7E757B | 76C4 9622 |
| 744A 970E | | 7542 BD7680 | 75CA BD773B | | 76C6 B4F8 |
| 744C 962B | 74B9 BD7680 | 7545 BD775B | 75CD CE7468 | 7656 BD7680 | 76C8 8A08 |
| 744E 9722 | 74BC BD76E7 | 7548 CE7498 | 75D0 7E757B | 7659 BD775B | 76CA 9722 |
| 7450 B74110 | 74BF CE7486 | 754B 7E757B | | 765C CE747C | 76CC B74110 |
| 7453 962E | 74C2 7E757B | | 75D3 BD7680 | | 76CF 01 |
| 7455 84FD | | 754E BD7680 | 75D6 BD77CB | 765F 7E757B | 76D0 01 |
| 7457 9720 | | 7551 BD76E7 | 75D9 CE746A | | 76D1 01 |
| 7459 38 | 74C5 BD7680 | 7554 CE000A | 75DC 7E757B | 7662 BD7680 | 76D2 01 |
| | 74C8 BD787C | 7557 FF4424 | | 7665 BD76E7 | 76D3 B64100 |
| 745A DE16 | 74CB CE7488 | 755A CE749A | 75DF BD7680 | 7668 CE000A | 76D6 01 |
| 745C EE3B | 74CE 7E757B | 755D 7E757B | 75E2 BD787C | 766B FF4424 | 76D7 01 |
| | | | | 766E CE747E | |

| | | | | | |
|---|---|---|---|---|---|
| 745E 6E10 | 74D1 BD7680 | | 75E5 CE746C | 7671 7E757B | 76D8 01 |
| | 74D4 BD77CB | 7560 BD7680 | 75EB 7E757B | | 76D9 01 |
| 7460 75A1 | 74D7 CE742A | 7563 BD78D5 | | 7674 BD7680 | 76DA 01 |
| 7462 75AF | 74DA 7E757B | 7566 CE749C | 75EB BD7680 | 7677 BD78D5 | 76DB 01 |
| 7464 75BB | | 7569 7E757B | 75EE BD76E7 | 767A CE749C | 76DC 01 |
| 7466 75C4 | 74DD BD7680 | | 75F1 BD76C4 | 767D 7E757B | 76DD 01 |
| 7468 75D3 | 74E0 BD76E7 | 756C B65140 | 75F4 CE746E | | 76DE 01 |
| 746A 75DF | 74E3 BD76C4 | 756F 8540 | 75F7 7E757B | 7680 9622 | 76DF 01 |
| 746C 75EB | 74E6 CE748C | 7571 2712 | | 7682 84F9 | 76E0 B64100 |
| 746E 75FA | 74E9 7E757B | 7573 CE3002 | 75FA BD7680 | 7684 8A09 | 76E3 43 |
| 7470 7606 | | 7576 FF4424 | 75FD BD775B | 7686 9722 | 76E4 971B |
| 7472 7615 | 74EC BD7680 | 7579 DE3B | 7600 CE7478 | 7688 B74110 | 76E6 39 |
| 7474 7621 | 74EF BD775B | 757B DF16 | 7603 7E757B | 768B 9699 | |
| 7476 763E | 74F2 CEFFFF | 757D 962B | | 768D 8580 | 76E7 D622 |
| 7478 7647 | 74F5 FF4454 | 757F 9722 | 7606 BD7680 | 768F 2729 | 76E9 C4FA |
| 747A 7656 | 74F8 CE748E | 7581 B74110 | 7609 CEFFFF | 7691 B64100 | 76EB CA0A |
| 747C 7662 | 74FB 7E757B | 7584 3B | 760C FF4454 | 7694 01 | 76ED D722 |
| 747E 7674 | | 7585 1F | 760F CE7472 | 7695 01 | 76EF F74110 |
| | 74FE BD7680 | 7586 8630 | 7612 7E757B | 7696 01 | 76F2 9637 |
| 7480 749E | 7501 BD76E7 | 7588 B75456 | | 7697 01 | 76F4 C520 |
| 7482 74AD | 7504 BD773B | 758B CE40FF | 7615 BD7680 | 7698 01 | 76F6 262E |
| 7484 74B9 | 7507 CE7490 | 758E FF5450 | 7618 BD76E7 | 7699 01 | 76F8 8120 |
| 7486 74C5 | 750A 7E757B | 7591 863A | 761B CE7474 | 769A 01 | 76FA 2516 |
| 7488 74D1 | | 7593 B75456 | 761E 7E757B | 769B 01 | 76FC 7A0037 |
| 748A 74DD | 750D BD7680 | 7596 CEB000 | | 769C 01 | 76FF B64100 |
| 748C 74EC | 7510 CE7492 | 7599 FF5450 | 7621 BD7680 | 769D 01 | 7702 01 |
| 748E 74FE | 7513 7E757B | 759C 0E | 7624 B65130 | 769E B64100 | 7703 01 |
| 7490 750D | | 759D 7E7573 | 7627 8510 | 76A1 43 | 7704 01 |
| 7492 7516 | 7516 BD7680 | | 7629 2719 | 76A2 F65140 | 7705 01 |
| 7494 751F | 7519 CE7494 | 75A0 BD7680 | 762B 7C002D | 76A5 C580 | 7706 01 |
| 7496 7542 | 751C 7E757B | 75A3 BD76E7 | 762E CE7476 | 76A7 2712 | 7707 01 |
| 7498 754E | | 75A6 BD76C4 | 7631 7E757B | 76A9 C540 | 7708 01 |
| 749A 7560 | | 75A9 CE7402 | 7634 962D | 76AB 270D | 7709 01 |
| | 751F BD7680 | 75AC 7E757B | 7636 27F6 | 76AD F65120 | 770A 01 |
| 749C 756C | 7522 BD76E7 | | 7638 7A002D | 76B0 8180 | 770B 01 |
| | 7525 BD76C4 | 75AF BD7680 | 763B 7E762E | 76B2 270E | 770C B64100 |
| | 7528 B65130 | 75B2 BD775B | | 76B4 240A | 770F 9711 |
| 749E BD7680 | 752B 8510 | 75B5 CE7464 | 763E BD7680 | 76B6 5A | 7711 39 |
| 74A1 BD76E7 | 752D 2719 | | | | |

| | | | | | |
|---|---|---|---|---|---|
| 7712 962B | 7781 273D | 77FA B74456 | 7877 8696 | 78F2 C580 | 797B D725 |
| 7714 8A20 | 7783 2502 | 77FD 8640 | 7879 7E7855 | 78F4 2651 | 797D F75100 |
| 7716 972B | 7785 DE26 | 77FF B74456 | | 78F6 DE55 | 7980 9602 |
| 7718 CA20 | 7787 DF26 | 7802 B64450 | 787C 862C | 78F8 FF5432 | 7982 8580 |
| 771A D722 | 7789 9626 | 7805 43 | 787E B75150 | 78FB 7E7961 | 7984 2601 |
| 771C F74110 | 778B D627 | 7806 F64451 | 7881 8600 | 78FE 8640 | 7986 39 |
| 771F B680 | 778D 9B45 | 7809 F64452 | 7883 B74466 | 7900 972D | 7987 9638 |
| 7721 9737 | 778F D946 | 780C 53 | 7886 8640 | 7902 B65120 | 7989 9140 |
| 7723 7E76FF | 7791 56 | 780D D7A8 | 7888 B74466 | 7905 8180 | 798B 250C |
| 7726 81DF | 7792 46 | 780F F64453 | 788B B64460 | 7907 2405 | 798D 913F |
| 7728 2406 | 7793 9745 | 7812 D621 | 788E 43 | 7909 864E | 798F 2410 |
| 772A 7C0037 | 7795 9726 | 7814 C540 | 788F F64461 | 790B 7E78E2 | 7991 C4D7 |
| 772D 7E76FF | 7797 D746 | 7816 2627 | 7892 F64462 | 790E B6B2 | 7993 D725 |
| 7730 962B | 7799 D727 | 7818 D633 | 7895 53 | 7910 7E78E2 | 7995 F75100 |
| 7732 84DF | 779B DE26 | 781A 260C | 7896 D7A8 | 7913 962D | 7998 39 |
| 7734 972B | 779D FF5474 | 781C D621 | 7898 F64463 | 7915 8180 | 7999 CA2B |
| 7736 C4DF | 77A0 54 | 781E CA40 | 789B 91A8 | 7917 24E5 | 799B D725 |
| 7738 7E771A | 77A1 46 | 7820 D721 | 789D 2721 | 7919 B65120 | 799D F75100 |
| | 77A2 C100 | 7822 9631 | 789F 241F | 791C 81E0 | 79A0 39 |

| | | | | | | |
|---|---|---|---|---|---|---|
| 773B D622 | 77A4 2608 | 7824 B75150 | 78A1 D6A8 | 791E 2409 | 79A1 CA2C | |
| 773D CA0F | 77A6 919D | 7827 39 | 78A3 D79C | 7921 812E | 79A3 C4F7 | |
| 773F D722 | 77A8 250A | 7828 91A8 | 78A5 959B | 7922 253A | 79A5 D725 | |
| 7741 F74110 | 77AA 919E | 782A 27F6 | 78A7 9E9C | 7924 B680 | 79A7 F75100 | |
| 7744 01 | 77AC 250C | 782C 2507 | 78A9 8196 | 7926 7E78E2 | 79AA 39 | |
| 7745 01 | 77AE CEFF70 | 782E C501 | 78AB 2423 | 7929 B6E0 | | |
| 7746 01 | 77B1 DF3F | 7830 2707 | 78AD 812C | 792B 7E78E2 | | |
| 7747 01 | 77B3 39 | 7832 7E7822 | 78AF 251A | 792E 862E | | |
| 7748 B64100 | 77B4 CE9000 | 7835 C501 | 78B1 9198 | 7930 7E78E2 | | |
| 774B 01 | 77B7 7E77B1 | 7837 27E9 | 78B3 2705 | 7933 DE53 | | |
| 774C 01 | 77BA CEB050 | 7839 7A0033 | 78B5 250E | 7935 FF5432 | | |
| 774D 01 | 77BD 7E77B1 | 783C 7E7822 | 78B7 7C0090 | 7938 7C7972 | | |
| 774E 01 | 77C0 9626 | 783F 91A8 | 78BA 9698 | 793B C520 | | |
| 774F 01 | 77C2 9128 | 7841 2724 | 78BC B75150 | 793D 2610 | | |
| 7750 01 | 77C4 27C1 | 7843 2422 | 78BF 39 | 793F DE57 | | |
| 7751 01 | 77C6 25BF | 7845 D6A8 | 78C0 979B | 7941 FF5432 | | |
| 7752 01 | 77C8 7E77B5 | 7847 D73D | 78C2 7E78A5 | 7944 7E7972 | | |
| 7753 01 | | 7849 9634 | 78C5 7A0098 | 7947 DE57 | | |
| 7754 01 | 77CB 8696 | 784B 9B3D | 78C8 7E78BA | 7949 FF5432 | | |
| 7755 B64100 | 77CD B75150 | 784D 8196 | 78CB B62C | 794C 7E7954 | | |
| 7758 9767 | 77D0 B630 | 784F 2426 | 78CD 7E78B1 | 794F DE57 | | |
| 775A 39 | 77D2 B74456 | 7851 812C | 78D0 8696 | 7951 FF5432 | | |
| | 77D5 FE4454 | 7853 251D | 78D2 7E78B1 | 7954 DE4F | | |
| 775B B6B0 | 77D8 DF35 | 7855 9131 | | 7956 FF5424 | | |
| 775D B74446 | 77DA 730035 | 7857 2705 | 78D5 D602 | 7959 7E7977 | | |
| 7761 8640 | 77DD 730036 | 7859 2511 | 78D7 C580 | 795C DE5B | | |
| 7762 B74446 | 77E0 F64260 | 785B 7C0031 | 78D9 2758 | 795E FF5432 | | |
| 7765 FE4442 | 77E3 C415 | 785E 9631 | 78DB C520 | 7961 DE51 | | |
| 7768 DF26 | 77E5 2711 | 7860 B75150 | 78DD 2734 | 7963 FF5424 | | |
| 776A FE4444 | 77E7 C105 | 7863 44 | 78DF B65120 | 7966 7E7977 | | |
| 776D DF28 | 77E9 270D | 7864 9732 | 78E2 D625 | 7969 C520 | | |
| 776F 730026 | 77EB 8608 | 7866 39 | 78E4 9738 | 796B 26EF | | |
| 7772 730027 | 77ED 9733 | 7867 9734 | 78E6 9140 | 796D DE55 | | |
| 7775 730028 | 77EF 9621 | 7869 7E7849 | 78E8 2551 | 796F FF5432 | | |
| 7778 730029 | 77F1 84BF | 786C 7A0031 | 78EA 913F | 7972 DE4D | | |
| 777B DE2B | 77F3 9721 | 786F 7E785E | 78EC 247E | 7974 FF5424 | | |
| 777D 9627 | 77F5 7E7822 | 7872 862C | 78EE C520 | 7977 D625 | | |
| 777F 9129 | 77F8 8600 | 7874 7E7855 | 78F0 2741 | 7979 C4DF | | |

Conclusion

From the foregoing detailed description it should be appreciated that an improved reel servo has been shown and described which has many desirable functional capabilities that are not found in prior art apparatus. Since the present invention is microprocessor controlled, the take-up and supply reels can be operated under different types of closed servo loop control during different operating modes, which greatly improves its overall operation. More specifically, it enables shuttling, cueing and still frame reproduction to be performed without the use of a capstan, which permits a less sophisticated and expensive capstan assembly to be used than would otherwise be possible. The unique use of circuitry enables the diameter of the tape wrapped on each of the supply and take-up reels to be instantaneously available for use by the microprocessor in controlling not only the reel servo, but other servos during particular operation during particular modes.

It should be understood that although preferred embodiments of the present invention have been illustrated and described, various modifications thereof will become apparent to those skilled in the art; and, accordingly, the scope of the present invention should be defined only by the appended claims and equivalents thereof.

Various features of the invention are set forth in the following claims.

What is claimed is:

1. In a magnetic tape recording and reproducing apparatus of the type which has a supply reel and a take-up reel for carrying magnetic tape, said apparatus being selectively operable in operating modes including normal speed reproducing, slow motion reproducing, stop motion reproducing, shuttle and record, a servo control system for controlling the drive motors of said take-up and supply reels, said servo control system comprising:

means for selectively driving a take-up reel motor in one of the forward and reverse directions;
means for selectively driving a supply reel motor in one of the forward and reverse directions;
means for providing output signals that are indicative of the rotational velocity of said take-up reel;
means for providing output signals that are indicative of the rotational velocity of said supply reel;
means for providing output signals that are indicative of the longitudinal tape speed; and
processing means for receiving the output signals from one of said reel velocity indication and for controlling one of said driving means in accordance with said diameter, wherein said longitudinal tape speed output signal providing means comprises a tachometer operably associated with an idler roller, said tachometer providing a predetermined number of output pulses per unit distance of tape travel, and wherein said driving means respectively apply a load current to said motors and further including means for monitoring the value of the load current applied to each of said reel motors and a movable arm for controlling the tension of the tape between the two reels, said processing means receiving said load current values and providing output signals to said movable arm for adjusting the tension and thereby maintain the load current within predetermined limits.

2. In a magnetic tape recording and reproducing apparatus of the type which has a supply reel and a take-up reel for carrying magnetic tape, said apparatus being selectively operable in operating modes including normal speed reproducing, slow motion reproducing, stop motion reproducing, shuttle and record, a servo control system for controlling the drive motors of said take-up and supply reels, said servo control system comprising:
means for selectively driving a take-up reel motor in one of the forward and reverse directions;
means for selectively driving a supply reel motor in one of the forward and reverse directions;
means for providing output signals that are indicative of the rotational velocity of said take-up reel;
means for providing output signals that are indicative of the rotational velocity of said supply reel;
means for providing output signals that are indicative of the longitudinal tape speed;
processing means for receiving the output signals from one of said reel velocity indication and for controlling one of said driving means in accordance with said diameter, wherein said longitudinal tape speed output signal providing means comprises a tachometer operably associated with an idler roller, said tachometer providing a predetermined number of output pulses per unit distance of tape travel; and
counter means for receiving output signals from said reel tachometer and from said idler tachometer, said processing means being adapted to interrogate said counter means and immediately receive said accumulated count and thereafter determine the diameter of tape wrapped on said reel, wherein said counter means further comprises two counters for each of said reel tachometers, the counters being alternately cleared and activated to accumulate idler roller tachometer pulses indicative of the tape speed, the clearing and activating of one counter interrupting the accumulation of pulses by the other counter to store an accumulated count therein, and processing means interrogating both of said counters and using the larger accumulated count value to determine the diameter of tape wrapped on said reel, one of said counters being cleared and activated and the other counter being interrupted in response to the reel tachometer pulse being received.

3. A servo control system as defined in claim 2 further including electronic gating means to increment the activated counter by a single count subsequently of the occurrence of a reel tachometer output signal in the absence of tape speed idler roller tachometer pulses, said processing means being adapted to detect the single count in said counters as a fault condition and immediately stop the reel motors.

4. A servo control system as defined in claim 3 wherein said gating means comprises an EXCLUSIVE OR gate having one input connected to said reel tachometer output and the other input connected to the idler roll tachometer output, the output of said EXCLUSIVE OR gate being connected to the clock input of both of said counter means.

5. In a magnetic recording and reproducing apparatus of the type which has a supply reel and a take-up reel for carrying magnetic tape, a movable arm for controlling the tension of the tape in the path between the two reels, and means for selectively moving the arm in opposite directions for selectively increasing or decreasing the tension of the tape, said apparatus being selectively operable in operating modes including normal speed reproducing, slow motion reproducing, stop motion reproducing, shuttle and record, a servo control system for controlling the drive motors of said take-up and supply reels, said servo control system comprising:
processing means for providing control signals to said reel drive motors for controlling the same during said operating modes, said processing means providing said control signals responsive to the operating mode in which the apparatus is placed, a load current applied to at least one of the reel motors the position of the movable arm and longitudinal tape speed;
said processing means during the record, normal reproducing and variable speed reproducing operating modes controlling said supply reel motor to maintain said movable arm in a predetermined range relative to a first predetermined position to maintain the proper tension on the tape and controlling said take-up reel to maintain the take-up reel drive motor load current within a predetermined load current range;
said processing means during the shuttle operating mode controlling said supply reel motor to maintain said movable arm in a predetermined range about a preferred position and controlling said take-up reel motor to maintain the tape at a predetermined velocity.

6. A servo system as defined in claim 5 wherein said processing means, when said apparatus is placed in the shuttle mode, provides output signals to said means for moving the arm to cause the same to be placed in said preferred position.

7. A servo system as defined in claim 6 wherein said preferred position of said movable arm is a second predetermined position while shuttling in a reverse direction and a third predetermined position while shuttling in the forward direction.

8. A servo system as defined in claim 7 wherein said second position increases the tape tension relative to said first predetermined position.

9. A servo system as defined in claim 7 wherein said third predetermined position of said arm decreases the tape tension, relative to said first predetermined position.

10. Apparatus as defined in claim 9 wherein said processing means monitors the movement of said arm during a shuttle operation and provides control signals to the supply reel drive motor to rapidly increase or decrease the speed thereof to return the arm to a position within the predetermined range of its preferred position.

11. A servo system as defined in claim 5 further including digital-to-analog converting means associated with each reel and operatively connected to said processing means for receiving output signals therefrom, the output of each of the digital-to-analog converters having an amplifier means connected thereto with the output of the amplifier means being connected to the appropriate reel motor.

12. A servo system as defined in claim 5 including means for supplying a desired speed input signal to said processing means, said processing means, during a shuttle operation, comparing the longitudinal tape speed with the desired speed input signal and providing control signals to said supply drive motor for varying the supply reel speed thereof for reducing any compared difference.

13. A method for determining the relative speeds of two moving elements, comprising the steps of:
generating a first series of pulses having a frequency related to the speed of one of the elements;
generating a second series of pulses having a frequency greater than the frequency of the first series of pulses and related to the speed of the other element;
initiating the counting of pulses in said second series in response to a pulse in said first series to generate a first count value;
interrupting said counting in response to a subsequent pulse in said first series and storing said first count value;
simultaneously with said interruption, initiating the counting of pulses in said first series to generate a second count value; and
selecting the greater of said first and second count values as an indication of the relative speeds of the two elements.

14. The method of claim 13 further including the steps of generating a predetermined count value as one of said first and second count values in the absence of pulses in said second series, and indicating that a fault condition exists in response to detection of said predetermined count value.

15. Apparatus for determining the relative speeds of two moving elements, comprising:
means for generating clock pulses having a frequency related to the speed of one of said elements;
means for generating a train of control pulses having a frequency related to the speed of the other element;
a first counter responsive to said control pulses for counting said clock pulses during one period of the control pulse train and for holding the accumulated count during the next successive period;
a second counter responsive to said control pulses for holding a previously accumulated count during said one period and for counting clock pulses during said next successive period; and
means for interrogating said counters and selecting a predetermined one of the count values accumulated thereby as an indication of the relative speeds of the two elements.

16. The apparatus of claim 15 wherein said interrogating means selects the greater of the two count values as the indication of relative speed.

17. The apparatus of claim 15 further including means for presenting a predetermined number of clock pulses to said counters when one of said elements moves during absence of movement of the other element, said interrogating means being responsive to said predetermined number of clock pulses being accumulated in at least one of said counters to indicate a fault condition.

18. The apparatus of claim 17 wherein said presenting means includes an exclusive-OR gate which receives said clock pulses at one input terminal thereof and said control pulses at a second input terminal.

19. A method for determining the rotational speed of a reel relative to the longitudinal speed of a tape wrapped on the reel, comprising the steps of:
generating a first series of pulses having a frequency related to the speed of one of the reel and the tape;
generating a second series of pulses having a frequency greater than the frequency of the first series of pulses and related to the speed the other of the tape and the reel;
initiating the counting of pulses in said second series in response to a pulse in said first series to generate a first count value;
interrupting said counting in response to a subsequent pulse in said first series and storing said first count value;
simultaneously with said interruption, initiating the counting of pulses in said first series to generate a second count value; and
selecting the greater of said first and second count values as an indication of the relative speeds of the reel and the tape.

20. The method of claim 19 further including the steps of determining the diameter of tape wrapped on the reel from said indication of relative speeds and controlling the rotational velocity of the reel in accordance with the determined diameter.

21. Apparatus for determining the rotational speed of a reel relative to the longitudinal speed of tape wrapped on the reel, comprising:
means for generating clock pulses having a frequency related to the speed of one of the reel and the tape;
means for generating a train of control pulses having a frequency related to the speed of the other of the reel and the tape;
a first counter responsive to said control pulses for counting said clock pulses during one period of the control pulse train and for holding the accumulated count during the next successive period;
a second counter responsive to said control pulses for holding a previously accumulated count during said one period and for counting clock pulses during said next successive period; and means for interrogating said counters and selecting a predetermined one of the count values accumulated thereby as an indication of the relative speeds of the reel and the tape.

22. The apparatus of claim 21 wherein said interrogating means selects the greater of the two count values as the indication of relative speed.

23. The apparatus of claim 21 further including means for presenting a predetermined number of clock pulses to said counters when the reel moves during absence of movement of the tape, said interrogating means being responsive to said predetermined number of clock pulses being accumulated in at least one of said counters to indicate a fault condition.

24. The apparatus of claim 23 wherein said presenting means includes and exclusive-OR gate which receives said clock pulses at one input terminal thereof and said control pulses at a second input terminal.

25. The apparatus of claim 21 further including means for controlling the rotational velocity of the reel in response to the indication of the relative speeds of the reel and the tape.

* * * * *

UNITED STATES PATENT AND TRADEMARK OFFICE
CERTIFICATE OF CORRECTION

PATENT NO. : 4,649,441

DATED : March 10, 1987

INVENTOR(S) : Kenneth Louth

It is certified that error appears in the above-identified patent and that said Letters Patent is hereby corrected as shown below:

```
Column  5, line 14, delete "scanner";
           line 43, delete "pulse tachometer", insert --tacho-
                    meter pulse--;
Column  7, line 40, delete "reel up", insert --up reel--;
Column  8, line 19, delete "forward", insert --toward--;
Column  9, line 16, delete "diagrams'';
           line 45, delete "wich", insert --which--;
Column 12, line  5, delete "clip", insert --chip--;
Column 34, line  3, delete "and", insert --the--;
Column 34, line 42, before "position", insert --reel tachometer
                    pulses,--.
```

Signed and Sealed this

Sixth Day of December, 1988

Attest:

DONALD J. QUIGG

*Attesting Officer*      *Commissioner of Patents and Trademarks*